United States Patent
Akamine et al.

(10) Patent No.: US 11,709,246 B2
(45) Date of Patent: Jul. 25, 2023

(54) RADAR APPARATUS

(71) Applicants: SOKEN, INC., Nisshin (JP); DENSO CORPORATION, Kariya (JP)

(72) Inventors: Yusuke Akamine, Nisshin (JP); Yasuyuki Miyake, Kariya (JP)

(73) Assignees: SOKEN, INC., Nisshin (JP); DENSO CORPORATION, Kariya (JP)

(*) Notice: Subject to any disclaimer, the term of this patent is extended or adjusted under 35 U.S.C. 154(b) by 284 days.

(21) Appl. No.: 17/026,668

(22) Filed: Sep. 21, 2020

(65) Prior Publication Data
US 2021/0003695 A1    Jan. 7, 2021

Related U.S. Application Data

(63) Continuation of application No. PCT/JP2019/011823, filed on Mar. 20, 2019.

(30) Foreign Application Priority Data

Mar. 23, 2018  (JP) .................................. 2018-056398
Mar. 15, 2019  (JP) .................................. 2019-049010

(51) Int. Cl.
  *G01S 13/58* (2006.01)
  *G01S 7/41* (2006.01)
  *G01S 7/35* (2006.01)

(52) U.S. Cl.
  CPC ............ *G01S 13/583* (2013.01); *G01S 7/352* (2013.01); *G01S 7/411* (2013.01); *G01S 7/356* (2021.05)

(58) Field of Classification Search
  CPC ........ G01S 13/583; G01S 7/352; G01S 7/411; G01S 7/356
  USPC ........................................................ 342/109
  See application file for complete search history.

(56) References Cited

U.S. PATENT DOCUMENTS

| | | | | |
|---|---|---|---|---|
| 4,979,154 A | * | 12/1990 | Brodeur | G01S 15/101 367/116 |
| 6,072,424 A | * | 6/2000 | Cremona | G01S 13/345 342/115 |
| 6,161,074 A | * | 12/2000 | Sielagoski | B60K 31/0008 701/79 |
| 6,714,155 B1 | * | 3/2004 | Rose | G01S 7/021 342/107 |
| 6,970,129 B2 | * | 11/2005 | Kumon | G01S 7/354 342/115 |
| 9,511,751 B2 | * | 12/2016 | Zagorski | B60W 30/095 |
| 11,056,002 B2 | * | 7/2021 | Andersson | B60Q 5/006 |

(Continued)

FOREIGN PATENT DOCUMENTS

| | | | | |
|---|---|---|---|---|
| JP | 2010038705 A | * | 2/2010 | ........... G01S 13/345 |
| JP | 2014134757 A | * | 7/2014 | ........... G06F 1/1601 |

(Continued)

*Primary Examiner* — Nuzhat Pervin
(74) *Attorney, Agent, or Firm* — Maschoff Brennan

(57) ABSTRACT

A radar apparatus is mountable to a vehicle. The radar apparatus includes an observing unit, an estimating unit, a predicting unit, a matching processing unit, and a determining unit. The estimating unit calculates, regarding an initial detection target object, a plurality of velocity estimation values in which folding is presumed, using a velocity observation value calculated by the observing unit. The predicting unit calculates a prediction value from each of the plurality of velocity estimation values. The matching processing unit performs association of the velocity prediction value and the velocity observation value.

30 Claims, 20 Drawing Sheets

(56) References Cited

U.S. PATENT DOCUMENTS

| | | | | |
|---|---|---|---|---|
| 2003/0122703 | A1* | 7/2003 | Kishida | G01S 13/345 |
| | | | | 342/107 |
| 2004/0207553 | A1* | 10/2004 | Rose | G01S 11/04 |
| | | | | 342/107 |
| 2007/0013580 | A1* | 1/2007 | Finch | G01S 13/5246 |
| | | | | 342/194 |
| 2008/0211714 | A1* | 9/2008 | Tabary | G01S 13/581 |
| | | | | 342/26 R |
| 2009/0222776 | A1* | 9/2009 | Meers | G06F 30/39 |
| | | | | 716/106 |
| 2010/0007544 | A1* | 1/2010 | Honikel | G01S 13/87 |
| | | | | 342/53 |
| 2010/0033364 | A1* | 2/2010 | Kishida | G01S 13/584 |
| | | | | 342/70 |
| 2012/0086596 | A1* | 4/2012 | Insanic | G01S 13/951 |
| | | | | 342/26 D |
| 2014/0118184 | A1* | 5/2014 | Minowa | G01S 13/589 |
| | | | | 342/104 |
| 2016/0124086 | A1* | 5/2016 | Jansen | G01S 13/931 |
| | | | | 342/107 |
| 2016/0138950 | A1* | 5/2016 | Sevar | G01F 1/712 |
| | | | | 73/861 |
| 2017/0115386 | A1* | 4/2017 | Morinaga | G01S 13/931 |
| 2022/0128352 | A1* | 4/2022 | Binder | G01B 11/026 |

FOREIGN PATENT DOCUMENTS

| | | | | | |
|---|---|---|---|---|---|
| JP | | 5610847 B2 | * | 10/2014 | G01S 13/60 |
| JP | | 2016003873 A | * | 1/2016 | G01S 13/34 |
| JP | | 2017125802 A | * | 7/2017 | G01S 13/42 |
| WO | WO-2011007828 A1 | | * | 1/2011 | G01S 13/343 |

* cited by examiner

FIG.10
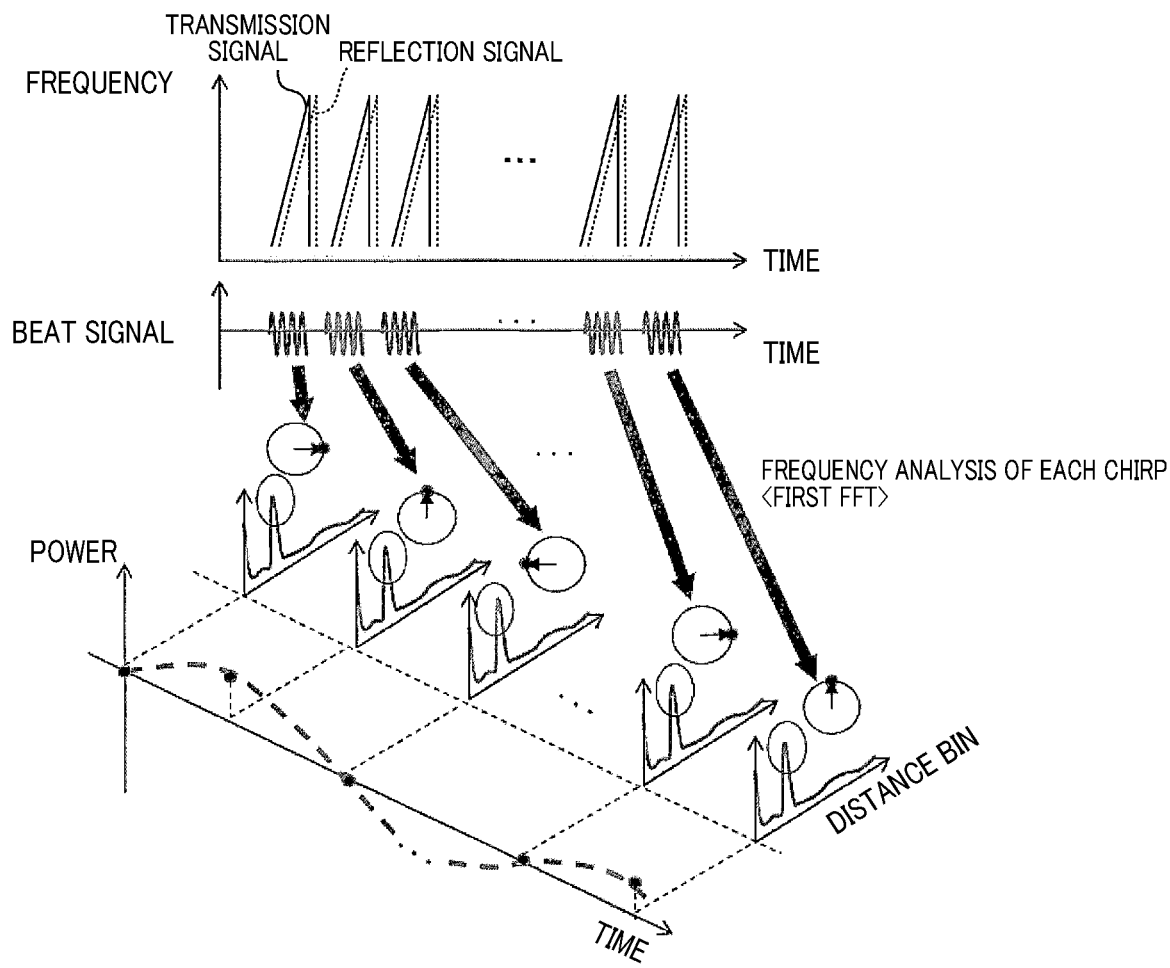
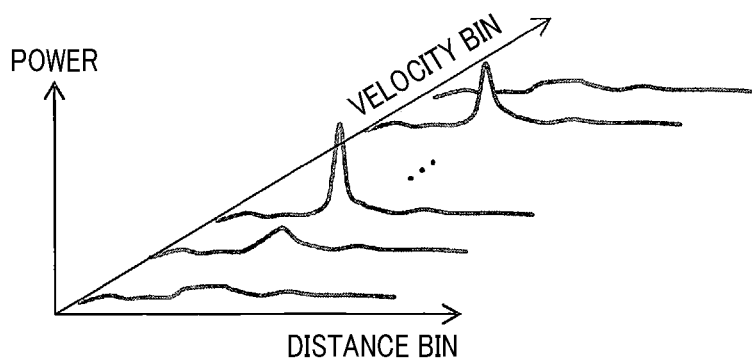

EXAMPLE OF NO FOLDING

EXAMPLE OF DETERMINATION AND SAME TARGET OBJECT DELETION

EXAMPLE OF EXTRAPOLATION

EXAMPLE OF PLURALITY OF TARGET OBJECTS

RADAR APPARATUS

CROSS-REFERENCE TO RELATED APPLICATIONS

The present application is a continuation application of International Application No. PCT/JP2019/011823, filed Mar. 20, 2019, which claims priority to Japanese Patent Application No. 2018-056398, filed Mar. 23, 2018 to the Japan Patent Office, and Japanese Patent Application No. 2019-049010, filed Mar. 15, 2019. The contents of these applications are incorporated herein by reference in their entirety.

BACKGROUND

Technical Field

The present disclosure relates to a radar apparatus.

Background Art

A known fast chirp modulation (hereafter, FCM)-type radar apparatus uses chirp signals of which a frequency continuously increases or decreases as radar signals, and measures a distance to a target object and a velocity of the target object.

SUMMARY

One aspect of the present disclosure provides a radar apparatus that is mountable to a vehicle. The radar apparatus transmits a transmission signal that is a pulse signal or a chirp signal at a repetition period that is set, and receives a reflection signal that is generated as a result of the transmission signal being reflected by a target object. The radar apparatus sets, as the repetition period of a next processing cycle, a repetition period that differs from the repetition period of a current processing cycle. The radar apparatus detects a target object signal that indicates the target object from the reflection signals, and calculates a velocity observation value from the detected target object signal. The velocity observation value is an observation value of a relative velocity relative to the target object. The radar apparatus calculates, regarding an initial detection target object, a plurality of velocity estimation values in which velocity folding from k times to k+n times is presumed, using the calculated velocity observation value. The initial detection target object is the target object that is initially detected in the current processing cycle. The radar apparatus calculates a velocity prediction value from each of the plurality of velocity estimation values. The velocity prediction value is a prediction value of the velocity observation value in the next processing cycle. The radar apparatus performs, in the next processing cycle, association of the velocity prediction value in the current processing cycle and the velocity observation value in the next processing cycle. The radar apparatus determines the relative velocity from the velocity prediction value and the velocity observation value based on a result of the association.

BRIEF DESCRIPTION OF THE DRAWINGS

FIG. 10 is an explanatory diagram of an overview of two-dimensional FFT;

DESCRIPTION OF THE EMBODIMENTS

Figure 1:
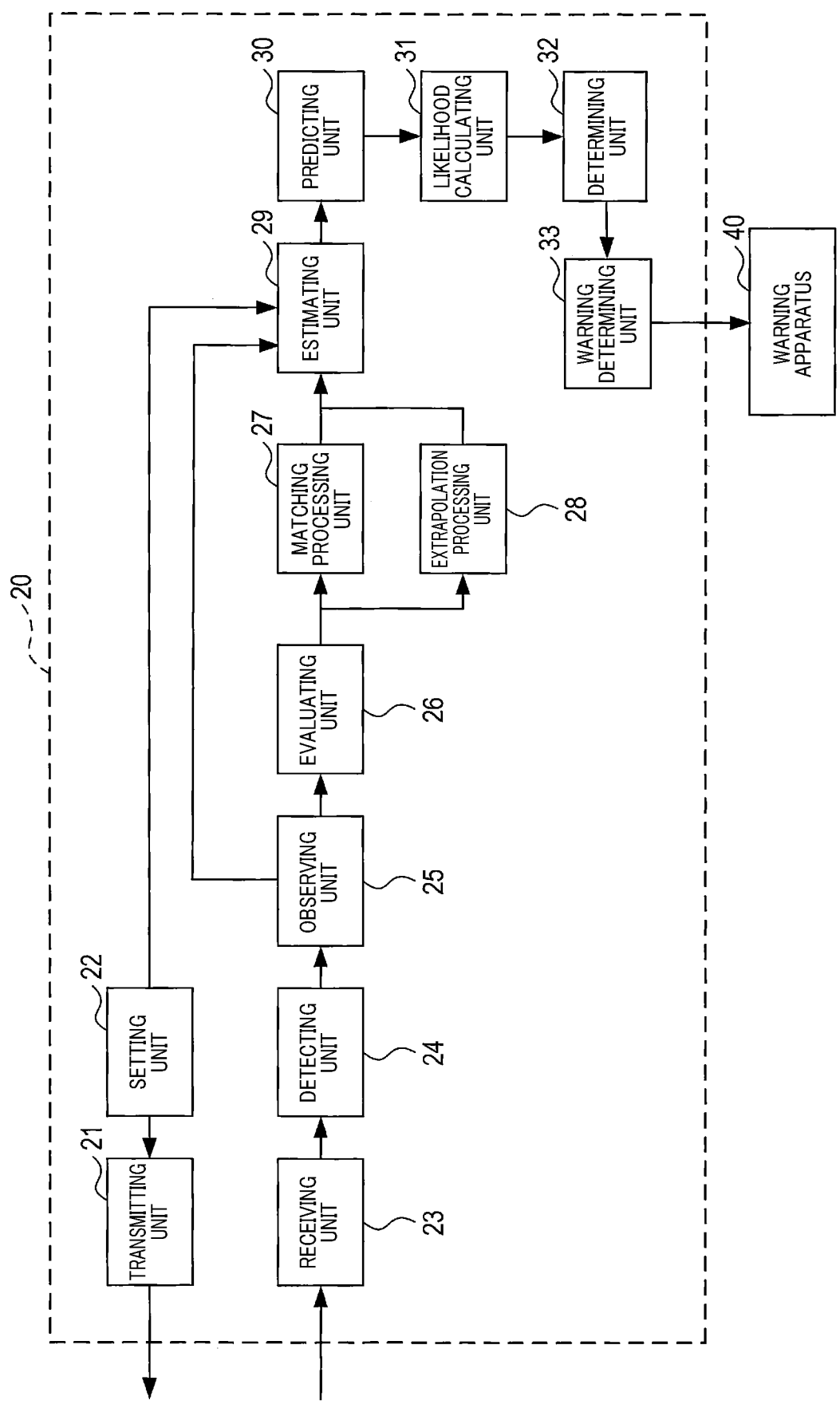
FIG. 1 is a block diagram of a configuration of a radar apparatus.

The FCM-type radar apparatus applies a two-dimensional fast Fourier transform (FFT) on beat signals that are generated from transmission/reception signals of the radar signals. Then, the FCM-type radar apparatus determines the distance to the target object based on the frequency of the beat signals, and determines a relative velocity in relation to the target object from phase rotation of frequency components that are continuously detected for the same target object. However, a detected phase θ is likely to be folded, and an actual phase is likely to be θ+2π×N. N is an integer. Therefore, there is ambiguity in the velocity that is determined from phase rotation. Such ambiguity in velocity can also occur in a radar apparatus that uses pulse signals as the radar signals.

In a radar apparatus that is described in Japanese Patent No. 6075846, below, focus is placed on velocities that are observed when folding occurs differing when repetition periods of the pulse signals differ. The radar apparatus described in Japanese Patent No. 6075846 transmits and receives the pulse signals at two differing repetition periods, and respectively calculates a first velocity and a second velocity based on the reception signals of the two repetition periods. Then, the radar apparatus described in Japanese Patent No. 6075846 corrects folding of the first velocity and the second velocity based on a velocity difference between the first velocity and the second velocity, and calculates a true velocity.

When observation values are compared between processing cycles that have differing repetition periods, the observation values are required to be associated between the processing cycles. In a case in which the target object is an initially detected target object, because a folding number thereof is not known, association of the observation values between the processing cycles is required to be performed through use of information on distance and strength, other than velocity.

However, as a result of detailed review by the inventors, an issue has been found in that, in an environment in which a plurality of target objects is present, if another reception signal of which distance and strength are close to those of a reception signal from a subject target object is observed, association of the observation values between the processing cycles is difficult to perform. Moreover, an issue has been found in that, if the observation value of the subject target object and an observation value of another target object is erroneously associated, velocity is erroneously estimated.

It is thus desired to provide a radar apparatus that is capable of accurately estimating a velocity of a target object even in an environment in which a plurality of target objects is present.

An exemplary embodiment of the present disclosure is a radar apparatus that is mountable to a vehicle. The radar apparatus includes a transmitting unit, a receiving unit, a setting unit, a detecting unit, an observing unit, an estimating unit, a predicting unit, a matching processing unit, and a determining unit.

The transmitting unit is configured to transmit a transmission signal that is a pulse signal or a chirp signal at a repetition period that is set.

The receiving unit is configured to receive a reflection signal that is generated as a result of the transmission signal transmitted by the transmitting unit being reflected by a target object.

The setting unit is configured to set, as the repetition period of a next processing cycle, a repetition period that differs from the repetition period of a current processing cycle.

The detecting unit is configured to detect a target object signal that indicates the target object from the reflection signals received by the receiving unit.

The observing unit is configured to calculate a velocity observation value from the target object signal detected by the detecting unit. The velocity observation value is an observation value of a relative velocity in relation to the target object.

The estimating unit is configured to calculate, regarding an initial detection target object, a plurality of velocity estimation values in which velocity folding from k times to k+n times is presumed, using the velocity observation value calculated by the observing unit. The initial detection target object is the target object that is initially detected by the detecting unit in the current processing cycle.

The predicting unit is configured to calculate a velocity prediction value from each of the plurality of velocity estimation values calculated by the estimating unit. The velocity prediction value is a prediction value of the velocity observation value in the next processing cycle.

The matching processing unit is configured to perform, in the next processing cycle, association of the velocity prediction value calculated by the predicting unit in the current processing cycle and the velocity observation value calculated by the observing unit in the next processing cycle.

The determining unit is configured to determine the relative velocity from the velocity prediction value and the velocity observation value based on a result of the association by the matching processing unit.

According to the exemplary embodiment, the transmission signals are transmitted at repetition periods that differ between the current processing cycle and the next processing cycle. The target object signal is detected from the reflection signals of the transmission signals, and the velocity observation value of the target object is detected. Here, the repetition periods differ between the current processing cycle and the next processing cycle. Therefore, maximum detected velocities of the velocity observation values differ. A difference occurs in the velocity observation values of a same target object when folding occurs.

In addition, a plurality of velocity estimation values in which a plurality of folding numbers are presumed is calculated from the velocity observation value in the current processing cycle. A plurality of velocity prediction values that are prediction values of the velocity observation value in the next processing cycle is calculated from the plurality of velocity estimation values.

In addition, in the next processing cycle, association of any of the velocity prediction values and the velocity observation value is performed. That is, the velocity observation value in the present processing cycle and the velocity observation value in the next processing cycle are associated. Then, the relative velocity of the target object is determined from the velocity prediction value and the velocity observation value that are associated. In this manner, the plurality of velocity prediction values corresponding to differing folding numbers is calculated and used. Therefore, even if a plurality of target objects that are close in distance and signal strength is observed in a same processing cycle, the velocity observation values between differing processing cycles can be appropriately associated. Therefore, even in an environment in which a plurality of target objects is present, association of the velocity observation values between processing cycles that have differing repetition periods can be appropriately performed. The velocity of the target object can be accurately estimated.

Exemplary embodiments of the present disclosure will hereinafter be described with reference to the drawings.

First Embodiment

<1. Configuration>

First, a configuration of a radar apparatus 20 according to a present embodiment will be described with reference to FIG. 1 to FIG. 8.

Figure 2:
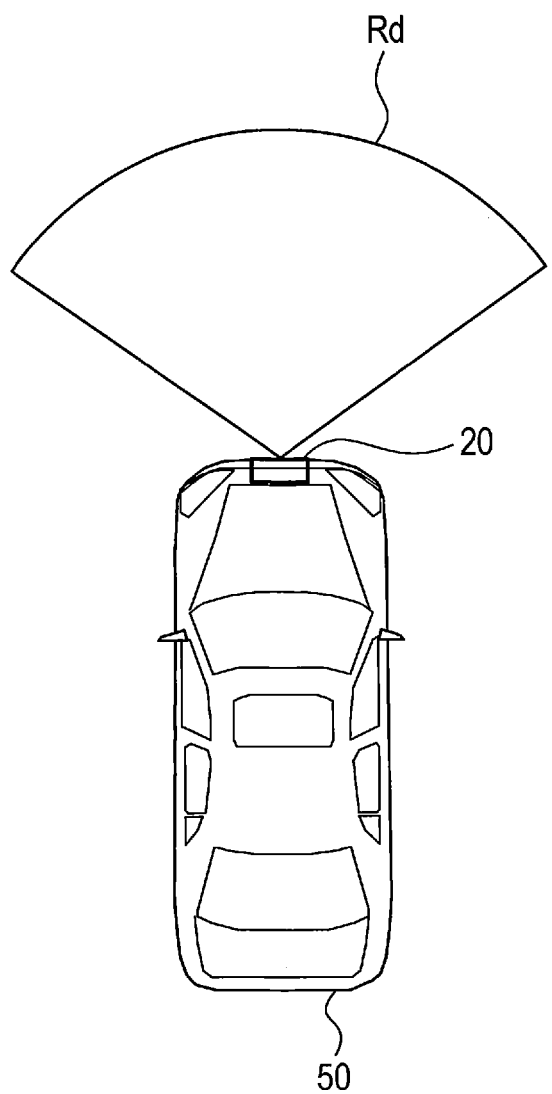
FIG. 2 is a diagram of an example of a mounting position in a vehicle and a detection area of the radar apparatus.
Figure 3:
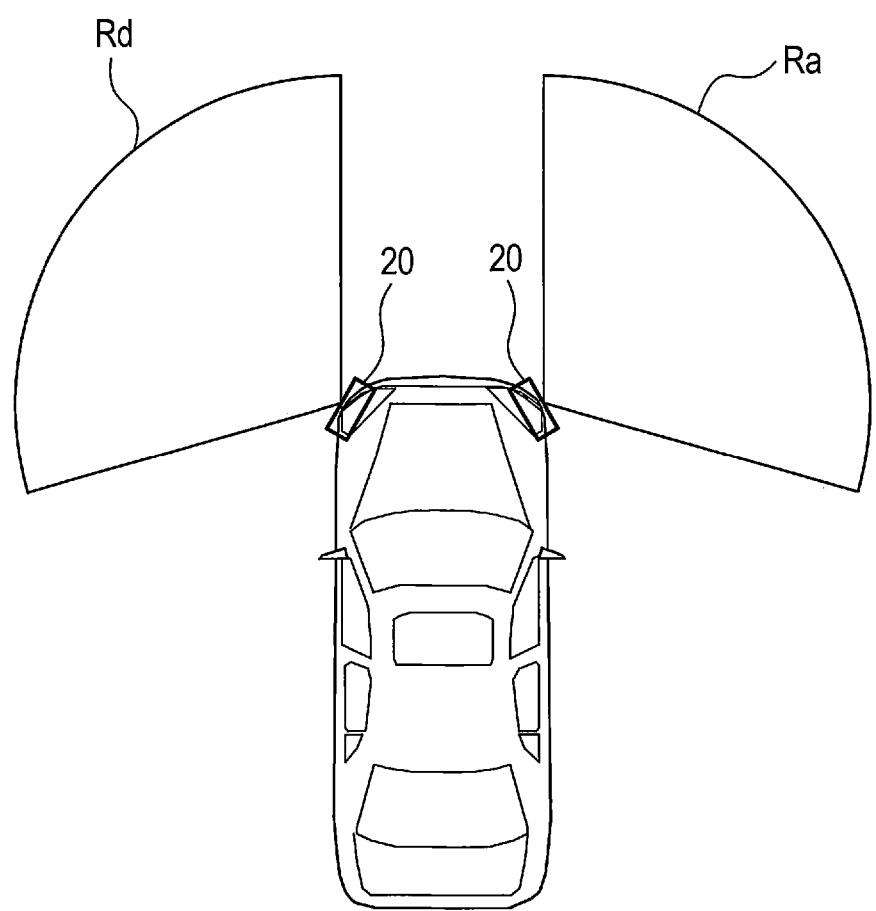
FIG. 3 is a diagram of another example of the mounting position in a vehicle and the detection area of the radar apparatus.

The radar apparatus 20 is an FCM-type millimeter-wave radar that transmits and receives chirp signals. The radar apparatus 20 is mounted to a vehicle 50. For example, as shown in FIG. 2, the radar apparatus 20 may be mounted in a front center (such as a center of a front bumper) of the vehicle 50. An area that is ahead of and in the center of the vehicle 50 may be a detection area Rd. Alternatively, as shown in FIG. 3, the radar apparatus 20 may be mounted in two sections on a front left side and a front right side (such as on a left end and a right end of the front bumper) of the vehicle 50. Areas ahead of and to the left and to the right of the vehicle 50 may be the detection area Rd.

Figure 4:
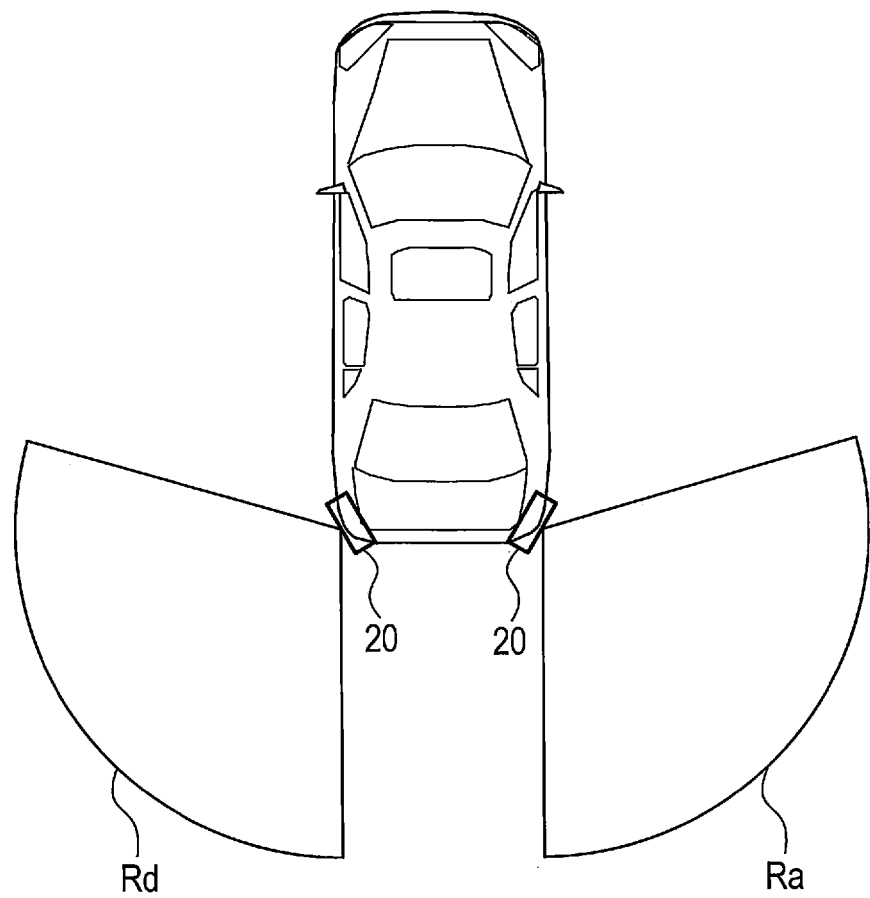
FIG. 4 is a diagram of another example of the mounting position in a vehicle and the detection area of the radar apparatus.
Figure 5:
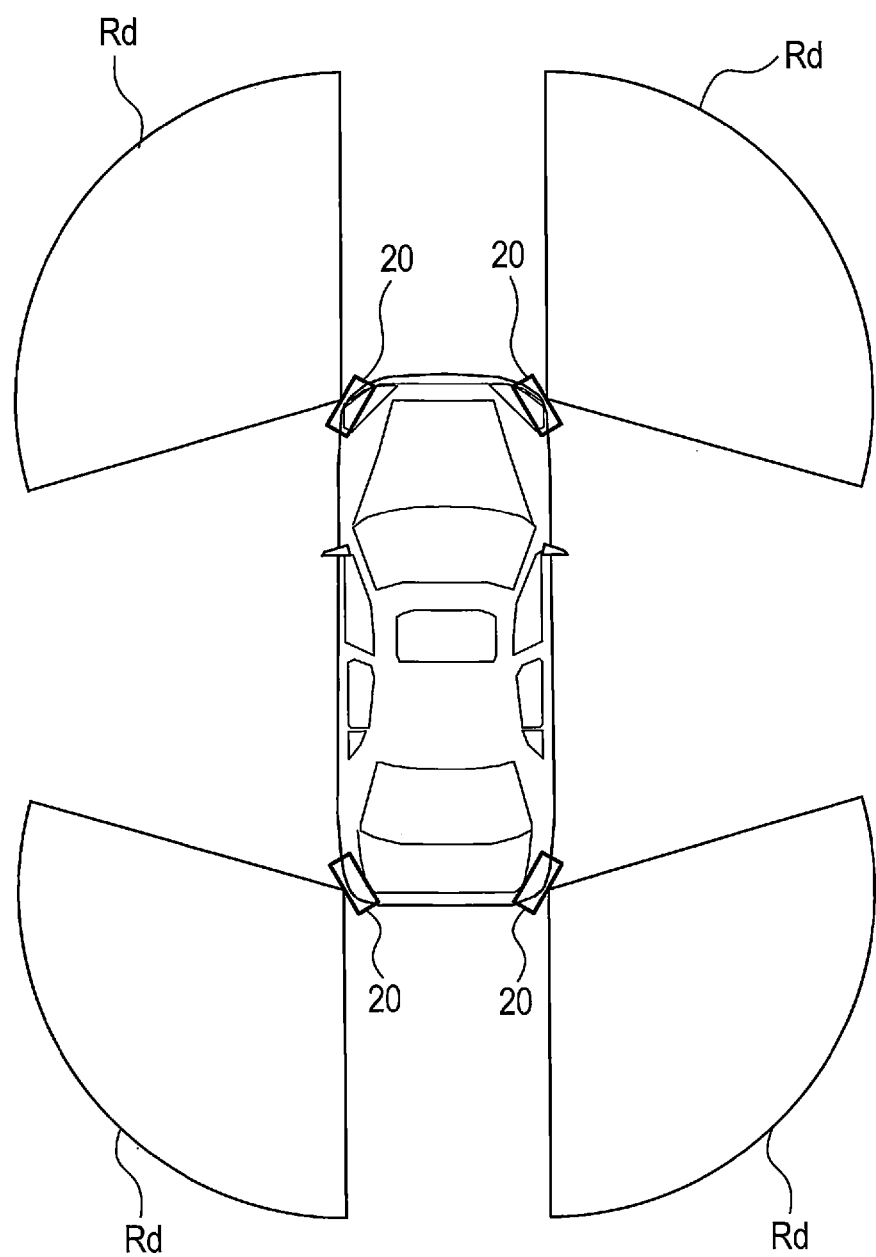
FIG. 5 is a diagram of another example of the mounting position in a vehicle and the detection area of the radar apparatus.

Alternatively, as shown in FIG. 4, the radar apparatus 20 may be mounted in two sections on a rear left side and a rear right side (such as on a left end and a right end of a rear bumper) of the vehicle 50. Areas behind and to the left and to the right of the vehicle 50 may be the detection area Rd. Alternatively, as shown in FIG. 5, the radar apparatus 50 may be mounted in four sections on the front left side, the front right side, the rear left side, and the rear right side of the vehicle 50. The areas ahead of and to the left and to the right, and behind and to the left and to the right of the vehicle 50 may be the detection area Rd.

Figure 6:
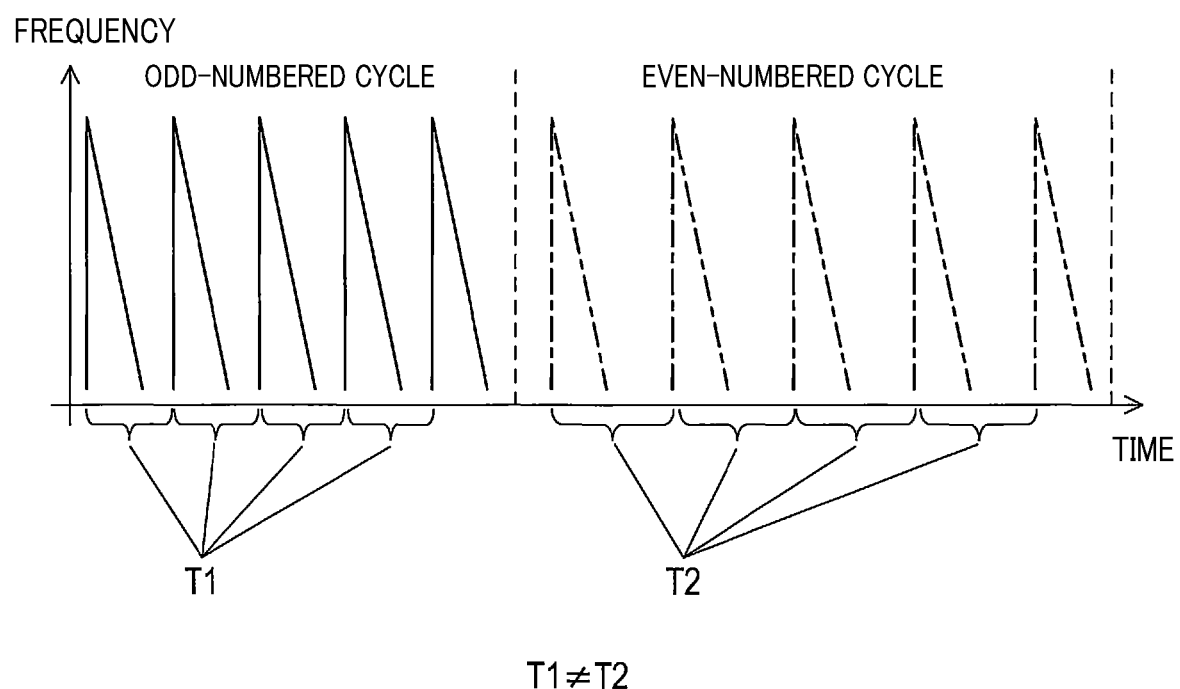
FIG. 6 is a diagram of waveforms of transmission signals in an odd-numbered processing cycle and an even-numbered processing cycle.

As shown in FIG. 6, the chirp signals are radar signals that have been subjected to frequency modulation such that the frequency changes in a sawtooth shape. That is, the chirp signals are radar signals of which the frequency continuously increases or decreases. FIG. 6 shows chirp signals of which the frequency continuously decreases. However, the chirp signals may be such that the frequency continuously increases. A repetition period of the chirp signals is a period from a start of transmission of one chirp signal to a start of transmission of a next chirp signal.

Figure 7:
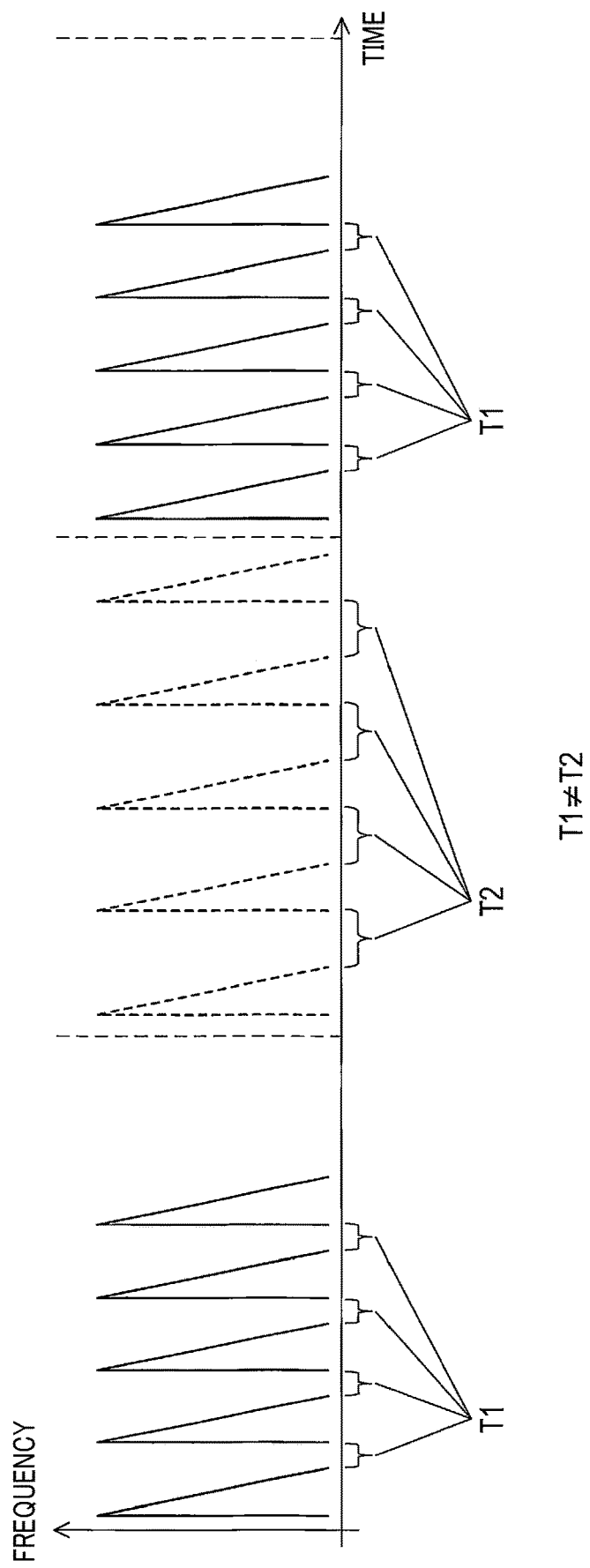
FIG. 7 is a diagram of an example of waveforms of transmission signals amounting to three processing cycles.
Figure 8:
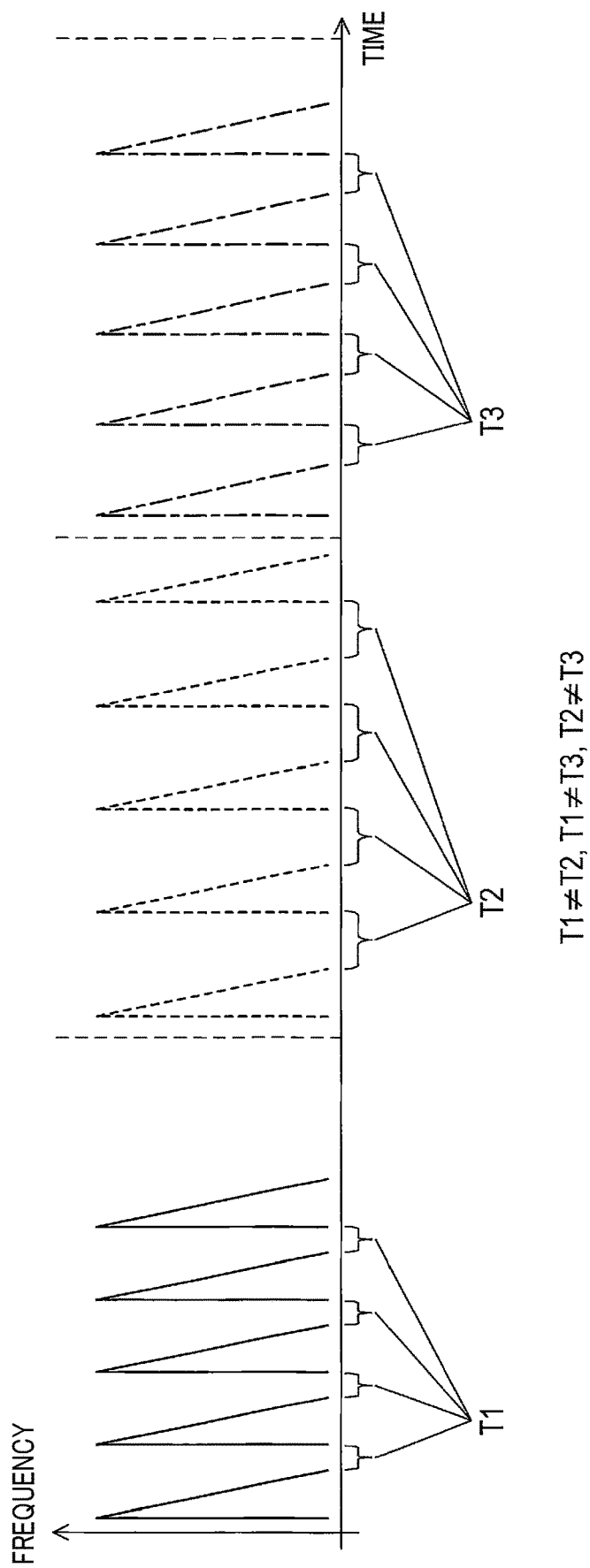
FIG. 8 is a diagram of another example of the waveforms of transmission signals amounting to three processing cycles.

In addition, FIG. 7 shows waveforms of the chirp signals amounting to three processing cycles, when the chirp signals of two differing repetition periods T1 and T2 are alternately transmitted. In addition, as shown in FIG. 8, the chirp signals of three differing repetition periods T1, T2, and T3 may be successively transmitted. In this case, chirp signals that amount to a single set are transmitted over the three processing cycles.

The radar apparatus 20 includes a microcomputer that includes a central processing unit (CPU), a read-only memory (ROM), a random access memory (RAM), and a core processor that performs an FFT process and the like.

In addition, the radar apparatus 20 provides functions of a transmitting unit (transmitter) 21, a setting unit 22, a receiving unit (receiver) 23, a detecting unit (detector) 24, an observing unit 25, an evaluating unit 26, a matching processing unit 27, an extrapolation processing unit 28, an estimating unit 29, a predicting unit 30, a likelihood calculating unit 31, a determining unit 32, and a warning determining unit 33. These functions may be actualized by the CPU or the like running a program that is stored in a memory such as the ROM. Alternatively, some or all of the functions may be actualized through hardware in which logic circuits, analog circuits, and the like are combined.

The transmitting unit 21 includes a transmission array antenna that is configured by a plurality of antenna elements. The transmitting unit 21 repeatedly transmits chirp signals at a repetition period Tcy that is set by the setting unit 22. The receiving unit 23 includes a reception antenna array that is configured by a plurality of antenna elements. The receiving unit 23 receives reflection signals that are generated as a result of the chirp signals being reflected by a target object The transmitting unit 21 transmits a plurality of chirp signals at the repetition period Tcy set by the setting unit 22, during a single processing cycle. In addition, the setting unit 22 sets the repetition period Tcy such that the repetition periods Tcy of consecutive processing cycles differ from each other.

For example, as shown in FIG. 6, when the repetition period Tcy of a current (or present) processing cycle is set to T1, the setting unit 22 sets the repetition period Tcy of a next processing cycle to T2 that differs from T1. For example, the setting unit 22 may set the repetition period Tcy to T1 for odd-numbered processing cycles and set the repetition period Tcy to T1 for even-numbered processing cycles.

Here, a maximum detected velocity Vmax of the chirp signals is expressed by a following expression (1). c denotes speed of light, and fc denotes a center frequency of the chirp signals.

$$V\max = c/(4 \times fc \times Tcy) \quad (1)$$

The maximum detected velocity Vmax is a maximum value of a magnitude of a velocity V that can be detected without folding. When the velocity V is within a range of −Vmax<V<Vmax, the velocity V can be detected without folding from the beat signals that are acquired as a result of the chirp signals being transmitted and received.

As shown in expression (1), the maximum detected velocity Vmax decreases as the repetition period Tcy increases. When differing repetition periods Tcy are set for consecutive processing cycles, the maximum detected velocities Vmax of the consecutive processing cycles differ.

The detecting unit 24, the observing unit 25, the evaluating unit 26, the matching processing unit 27, the extrapolation processing unit 28, the estimating unit 29, the predicting unit 30, the likelihood calculating unit 31, and the determining unit 32 detect a target object signal from the reflection signals received by the receiving unit 23, and estimate and determine the velocity V and a distance R of the target object from the detected target object signal.

The target object signal is a signal that indicates the presence of a target object. In addition, here, a relative velocity in relation to the vehicle 50 is referred to as a velocity V of the target object. A distance from the vehicle 50 to the target object is referred to as a distance R of the target object. Here, details of a determination process for the velocity and the distance of a target object will be described hereafter.

The warning determining unit 33 determines whether a warning is to be outputted, the target object of which the velocity V is determined by the determining unit 32 being a warning subject. That is, the warning determining unit 33 calculates a likelihood of a collision between the target object of which the velocity V is determined and the vehicle 50. When the likelihood of a collision exceeds a threshold, the warning determining unit 33 determines that a warning is to be outputted and instructs a warning apparatus 40 to output a warning.

The warning apparatus 40 is an indicator that is provided in a side mirror or inside a vehicle cabin, a speaker inside the vehicle cabin, a display inside the vehicle cabin, or the like. In response to the instruction from the warning determining unit 33 to output a warning, the warning apparatus 40 flashes, outputs a warning sound or a voice, or displays a warning.

<2. Velocity Determination Process>

Next, the processing steps in a velocity determination process that is performed by the radar apparatus 20 will be described with reference to a flowchart in FIG. 9.

First, at S10, the transmitting unit 21 repeatedly transmits a plurality of chirp signals at a repetition period that is set.

In addition, the receiving unit 23 receives reflection signals that are generated as a result of the chirp signals transmitted by the transmitting unit 21 being reflected by a target object.

Next, at S20, the detecting unit 24 detects a target object signal that indicates a target object from the reflection signals received at S10. Specifically, as shown in FIG. 10, the detecting unit 24 acquires beat signals from the transmission signals and the reflection signals. When a quantity of chirp signals that are included in a single processing cycle is N, an N-number of beat signals are acquired.

Then, as shown in FIG. 10, the detecting unit 24 performs an FFT process on each of the acquired N-number of beat signals as a first FFT process. The detecting unit 24 calculates an N-number of distance spectrums. The distance spectrum is a two-dimensional spectrum indicating power in relation to distance. The beat signal has a frequency component that is based on a distance to an object. Therefore, a frequency BIN of the calculated distance spectrum corresponds to a distance BIN.

Furthermore, the detecting unit 24 performs the FFT process on the respective distance BINS of the calculated N-number of distance spectrums as a second FFT process. The detecting unit 24 calculates a distance velocity spectrum. The distance velocity spectrum is a three-dimensional spectrum that indicates power in relation to distance and velocity. The detecting unit 24 then searches the calculated distance velocity spectrum for peak velocity BIN and distance BIN, and extracts the peak as the target object signal that indicates the presence of a target object.

Next, at S30, the observing unit 25 calculates a velocity observation value Vob and a distance observation value Rob of the target object from the velocity BIN and the distance BIN of the target object signal extracted at S20. Furthermore, the observing unit 25 may apply an arrival direction estimation algorithm on the target object signal, calculate an orientation spectrum that includes orientation information on the target object in relation to the vehicle 50, and calculate an orientation of the target object.

Next, at S40, the radar apparatus 20 determines whether target object information that is not yet processed is present. The target object information that is not yet processed refers to a velocity prediction value Vpr that is calculated in a process at S70 or S150 in a previous processing cycle and of which an evaluation value is not calculated.

The velocity prediction value Vpr is a value that is calculated in a previous processing cycle as a prediction value of the velocity observation value Vob of the target object in the current processing cycle. A distance prediction value Rpr is a value that is calculated in the previous processing cycle as a prediction value of the distance observation value Rob of the target object in the current processing cycle. Furthermore, the evaluation value is a value that is calculated in a process at S100, described hereafter, and is a value that is used in matching of the velocity prediction value Vpr and the velocity observation value Vob.

When determined that target object information that is not yet processed is not present at S40, the radar apparatus 20 proceeds to a process at S50. When determined that target object information that is not yet processed is present at S40, the radar apparatus 20 proceeds to the process at S100.

At S50, the radar apparatus 20 determines whether a target object signal that is not yet subjected to a matching process or an extrapolation process, described hereafter, is present. When a target object signal that is not yet subjected to the matching process or the like is determined to be present at S50, a target object signal that is not yet subjected to the matching process or the like is present regardless of target object information that is not yet processed not being present.

In this case, the radar apparatus 20 determines that the target object signal that is not yet subjected to the matching process or the like is a signal that indicates an initial detection target object that is detected for the first time in the current processing cycle. The radar apparatus 20 then proceeds to a process at S60.

At S60, the estimating unit 29 calculates a plurality of velocity estimation values Ves in which velocity folding from k times to k+n times (k being an integer, and n being an integer that is 1 or greater) is presumed, using the velocity observation value Vob calculated at S30. The presumption of velocity folding from k times to k+n times may not include a presumption of no velocity folding.

According to the present embodiment, the estimating unit 29 calculates the plurality of velocity estimation values Ves in which velocity folding from k times to k+n times (k being an integer that is 0 or less, n being an integer that is 1 or greater, and k+n being an integer that is 0 or greater) is presumed such that the presumption of no velocity folding is included. Specifically, the velocity estimation value Ves is calculated from a following expression (2). M denotes a folding number and is an integer from k to k+n.

$$Ves = Vob + 2 \times Vmax \times M \quad (2)$$

For example, the estimating unit 29 calculates three velocity estimation values Vesa, Vesb, and Vesc by presuming no folding (that is, M=0), folding of +1 time (that is, M=1), and folding of −1 time (that is, M=−1).

Next, at S70, the predicting unit 30 calculates the velocity prediction value Vpr that is the prediction value of the velocity observation value Vob in the next processing cycle, and the distance prediction value Rpr that is the prediction value of the distance observation value Rob in the next processing cycle, from each of the plurality of velocity estimation values Ves calculated at S60. Specifically, the predicting unit 30 directly sets the plurality of velocity estimation values Ves as a plurality of velocity prediction values Vpr, under an assumption that the orientation of the target object is fixed. In addition, the predicting unit 30 calculates a plurality of distance prediction values Rpr under an assumption that the target object moves at each of the plurality of velocity estimation values Ves.

For example, when the three velocity estimation values Vesa, Vesb, and Vesc are calculated, the predicting unit 30 calculates three velocity prediction values Vpra, Vprb, and Vprc. In addition, in this case, the predicting unit 30 calculates distance prediction values Rpra, Rprb, and Rprc when the target object moves at each of Vesa, Vesb, and Vesc.

Next, at S80, the likelihood calculating unit 31 calculates an initial value of likelihood that indicates a probability of each of the velocity estimation values Ves calculated at S60. A range of the velocity V that the target object is capable of achieving changes based on the velocity of the vehicle 50, a type of the target object, and a position of the target object. A possible range of the folding number M also changes based on the range of the velocity V. Therefore, the likelihood calculating unit 31 calculates the initial value of the likelihood that differs for each folding number, based on at least one of the velocity of the vehicle 50, the type of the target object, and the position of the target object.

The type of the target object is a vehicle, a pedestrian, a bicycle, or the like. A relationship between distance and strength of the target object signal differs based on the target object. For example, if the target object is a pedestrian, the target object signal is low in strength even when the distance is near. If the target object is a vehicle, the target object signal is high in strength, even when the distance is far. Therefore, the likelihood calculating unit 31 estimates the type of the target object from the relationship between the distance to the target object and the strength of the target object signal.

Figure 11:
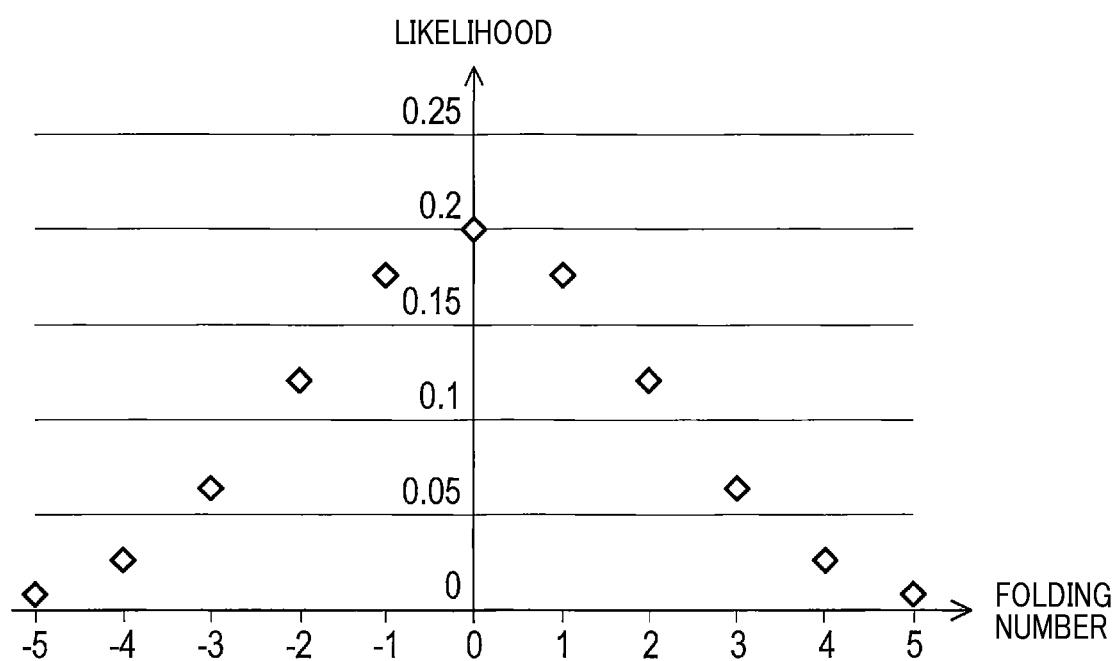
FIG. 11 is a diagram of an example of an initial value of likelihood in relation to a folding number of a velocity estimation value.

For example, the likelihood calculating unit 31 may determine that the likelihood of velocity folding not occurring is high when the target object is determined to be a vehicle and the maximum detected velocity Vmax is relatively large, or when the type of the target object cannot be determined. The likelihood calculating unit 31 may calculate the initial value of the likelihood using an initial value distribution shown in FIG. 11. The initial value distribution shown in FIG. 11 is a distribution in which the likelihood when the folding number M=1 is maximum and gradually decreases based on an increase in an absolute value of the folding number M.

Figure 12:
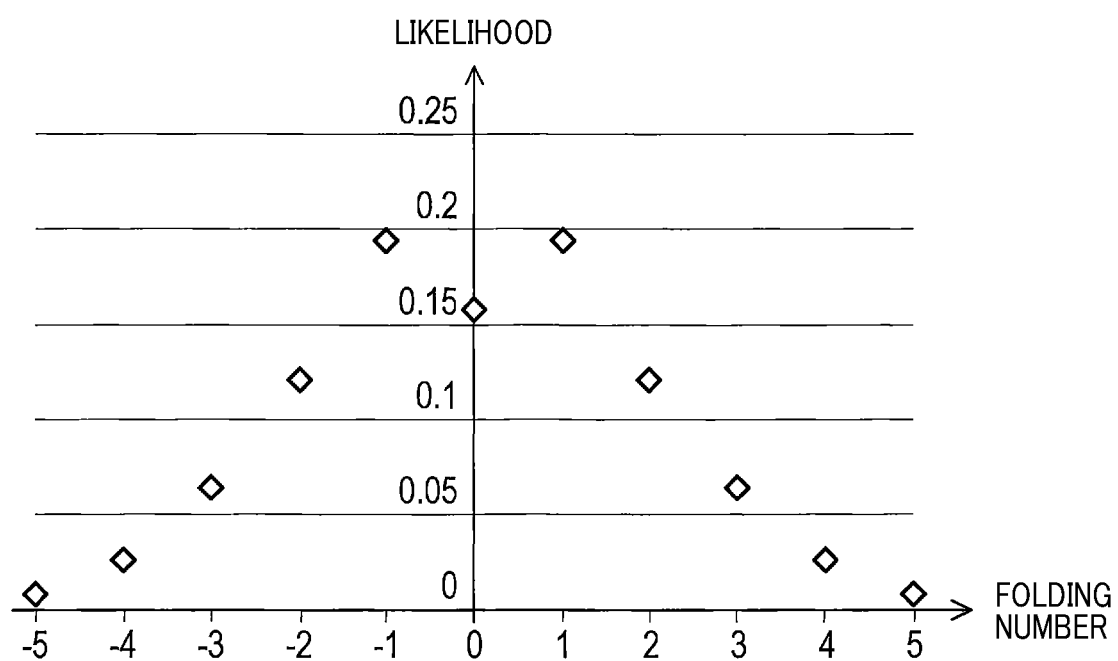
FIG. 12 is a diagram of another example of the initial value of likelihood in relation to the folding number of the velocity estimation value.

In addition, for example, the likelihood calculating unit 31 may determine that the likelihood of velocity folding occurring is high when the target object is determined to be a vehicle and the maximum detection velocity Vmax is relatively small. The likelihood calculating unit 31 may calculate the initial value of the likelihood using an initial value distribution shown in FIG. 12. The initial value distribution shown in FIG. 12 is a distribution in which the likelihood when the folding number M=±1 is greater than that when the folding number M=0 and gradually decreases based on the increase in the absolute value of the folding number M.

Furthermore, for example, the likelihood calculating unit 31 may determine that the likelihood of the target object moving in a leftward direction and moving away from the vehicle 50 is high when the target object is positioned on a front left side of the vehicle 50 or, specifically, further towards the left side than a road on which the vehicle 50 is traveling.

Figure 13:
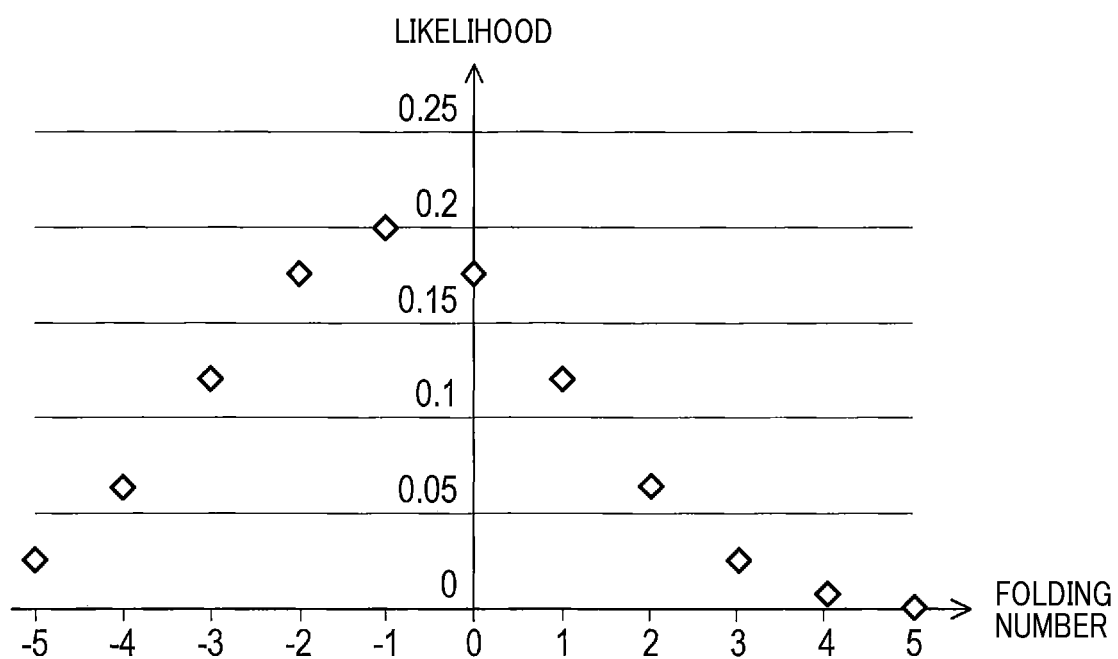
FIG. 13 is a diagram of another example of the initial value of likelihood in relation to the folding number of the velocity estimation value.

In this case, the likelihood calculating unit 31 may calculate the initial value of the likelihood using an initial value distribution shown in FIG. 13. The initial value distribution shown in FIG. 13 is a distribution in which the likelihood when the folding number M=−1 is maximum and gradually decreases based on increase and decrease from −1 of the folding number M. When the folding number M is positive, the target object approaches the vehicle 50. When the folding number M is negative, the target object moves away from the vehicle 50.

Figure 14:
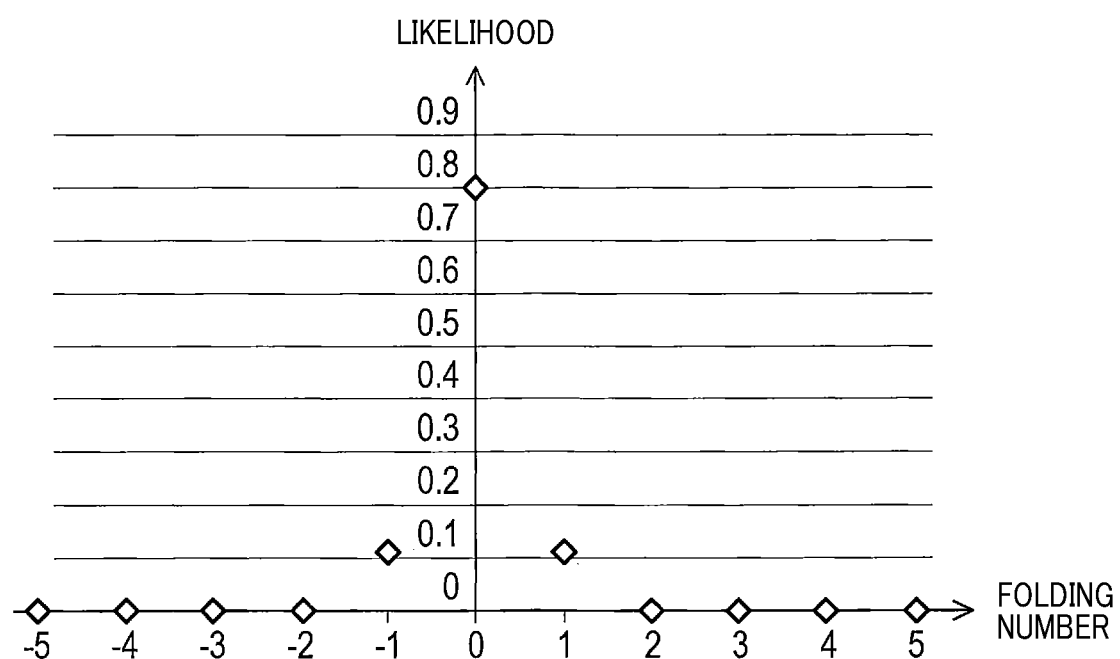
FIG. 14 is a diagram of another example of the initial value of likelihood in relation to the folding number of the velocity estimation value.

In addition, for example, the likelihood calculating unit 31 may determine that the likelihood of velocity folding not occurring is very high when the target object is determined to be a pedestrian. The likelihood calculating unit 31 may calculate the initial value of the likelihood using an initial value distribution shown in FIG. 14. The initial value distribution shown in FIG. 14 is a distribution in which the likelihood when the folding number M=0 is maximum and greater than the likelihood when M=0 in the initial value distribution shown in FIG. 11, and rapidly decreases based on the increase in the absolute value of the folding number M. In the initial value distribution shown in FIG. 14, the likelihood when the absolute value of the folding number M is 2 or greater is 0.

Moreover, because velocity folding more easily occurs as the velocity of the vehicle 50 becomes faster, the likelihood calculating unit 31 may calculate the initial value of the likelihood using an initial value distribution in which a distribution width becomes wider as the velocity of the vehicle 50 becomes faster.

Next, returning to the process at S50, when a target object signal that is not yet subjected to the matching process or the like is determined to not be present, the matching process or the extrapolation process has been performed on all target object signals. Therefore, in this case, the radar apparatus 20 proceeds to a process at S90.

At S90, the setting unit 22 sets the repetition period Tcy of the chirp signals that differs from that of the current processing cycle and ends the current processing cycle. As a result, the maximum detected velocity Vmax of the velocity of the target object that is detected in the next processing cycle is a value that differs from the maximum detected velocity Vmax in the current processing cycle.

Next, returning to the process at S40, when target object information that is not yet processed is determined to be present, the radar apparatus 20 proceeds to the process at S100.

At S100, the evaluating unit 26 calculates the evaluation value. The evaluation value is a value that evaluates correspondence between each of the velocity prediction values Vpr and the distance prediction values Rpr calculated in the previous processing cycle and each of the velocity observation value Vob and the distance observation value Rob calculated in the process at S30 in the current processing cycle. A greater value indicates higher correspondence.

The evaluating unit 26 calculates the evaluation value to be higher as differences between each of the velocity prediction values Vpr and the distance prediction values Rpr calculated in the previous processing cycle and each of the velocity observation value Vob and the distance observation value Rob calculated in the current processing cycle decrease.

Specifically, for each of the plurality of velocity prediction values Vpr calculated in the previous processing cycle, the evaluating unit 26 calculates a first difference that is a difference with a value that is closest of the velocity observation value Vob and a folding value thereof. In addition, for each of the velocity prediction values Vpr, the evaluating unit 26 calculates a second difference that is the difference between the corresponding distance prediction value Rpr and the distance observation value Rob. In addition, for each velocity prediction value Vpr, the evaluating unit 26 calculates the evaluation value to be higher as a total of the first difference and the second difference decreases.

Next, at S110, the matching processing unit 27 determines whether a matching subject is present. The matching subject is a combination of which the evaluation value is the greatest and higher than an evaluation threshold set in advance, among combinations of the velocity observation value Vob corresponding to the same initial detection target object and the folding value thereof, and each of the plurality of velocity prediction values Vpr. At S110, when determined that the matching subject is present, the matching processing unit 27 proceeds to a process at S120. When determined that the matching subject is not present, the matching processing unit 27 proceeds to a process at S130.

At S120, the matching processing unit 27 performs association of the combination that is the matching subject. For example, in a case of a target object in which folding occurs −1 time, among the combinations of the velocity observation value Vob corresponding to this target object and the folding value thereof, and each of the plurality of velocity prediction values Vpr, the evaluation value of a combination that includes the velocity prediction value Vprc in which folding of −1 time is presumed is the greatest and higher than the evaluation threshold. Therefore, association of this combination is performed.

Next, at S140, the estimating unit 29 calculates the velocity estimation value Ves based on the velocity prediction value Vpr of which matching is established among the plurality of velocity prediction values Vpr, and the velocity observation value Vob. That is, the estimating unit 29 calculates the velocity estimation value Ves based on the velocity prediction value Vpr and the velocity observation value Vob or the folding value thereof corresponding to the evaluation value that exceeds the evaluation threshold.

In the case of an initial detection target object, the velocity prediction value Vpr is not present. Therefore, the estimating unit 29 calculates the velocity estimation value Ves from only the velocity observation value Vob in the process at S60. In contrast, in the case of a target object that has been detected in a past processing cycle, the velocity prediction value Vpr is present. Therefore, the estimating unit 29 calculates the velocity estimation value Ves using both the velocity prediction value Vpr of which matching is established and the velocity observation value Vob or the folding value thereof. Specifically, the estimating unit 29 performs weighted average of the velocity observation value Vob and the velocity estimation value Ves or the folding value thereof, and calculates the velocity estimation value Ves. As a result, a velocity estimation value Ves that is more stable is calculated, compared to when the velocity estimation value Ves is calculated through use of only the velocity observation value Vob which significantly varies.

In addition, the estimating unit 29 performs the extrapolation process in which the velocity estimation value Ves is calculated without using the velocity observation value Vob or the folding value thereof, regarding the velocity prediction value Vpr of which matching is not established. That is, the estimating unit 29 directly sets the velocity prediction value Vpr of which matching is not established as the velocity estimation value Ves. From the foregoing, a same number of velocity estimation values Ves as the velocity prediction values Vpr is calculated.

Furthermore, in a manner similar to the velocity estimation value Ves, the estimating unit 29 calculates a distance estimation value Res based on the distance prediction value Rpr that corresponds to the velocity prediction value Vpr of which matching is established and the distance observation value Rob. Specifically, the estimating unit 29 calculates the distance estimation value Res from a following expression (3). α denotes filter gain.

$$Res = Rpr + \alpha(Rob - Rpr) \quad (3)$$

In addition, regarding the distance prediction value Rpr that corresponds to the velocity prediction value Vpr of which matching is not established, the estimating unit 29 performs the extrapolation process in which the distance estimation value Res is calculated without using the distance observation value Rob. Specifically, the estimating unit 29 calculates the distance estimation value Res from a following expression (4). From the foregoing, a same number of distance estimation values Res as the velocity prediction values Vpr is calculated.

$$Res = Rpr \quad (4)$$

Meanwhile, at S130, matching is not established regarding any of the plurality of velocity prediction values Vpr. Therefore, the extrapolation processing unit 28 performs the above-described extrapolation process on each velocity prediction value Vpr and calculates the same number of velocity estimation values Ves as the velocity prediction values Vpr. In addition, the extrapolation processing unit 28 performs the above-described extrapolation process on each distance prediction value Rpr and calculates the same number of distance estimation values Res as the velocity prediction values Vpr.

Next, at S150, the predicting unit 30 calculates a plurality of velocity prediction values Vpr of the next processing cycle using the velocity estimation values Ves calculated in the process at S130 or S140. In addition, the predicting unit 30 calculates a plurality of distance prediction values Rpr of the next processing cycle using the velocity estimation values Ves and the distance estimation values Res calculated in the process at S130 or S140.

Next, at S160, the likelihood calculating unit 31 calculates a likelihood of each of the velocity estimation values Ves calculated at S130 or S140. Specifically, regarding the velocity estimation value Ves calculated from the velocity prediction value Vpr of which matching is established, the likelihood calculating unit 31 increases a likelihood that has been calculated in the previous processing cycle regarding a velocity estimation value Ves that corresponds to said velocity estimation value Ves, and sets the increased likelihood as the likelihood in the current processing cycle. At this time, the likelihood calculating unit 31 may change the likelihood of the velocity estimation value Ves based on the evaluation value regarding the velocity prediction value Vpr of which matching is established. That is, the likelihood calculating unit 31 may increase an amount of increase in likelihood as the evaluation value increases.

Meanwhile, regarding the velocity estimation value Ves that is subjected to the extrapolation process, the likelihood calculating unit 31 decreases a likelihood that has been calculated in the previous processing cycle regarding a velocity estimation value Ves that corresponds to said velocity estimation value Ves, and sets the decreased likelihood as the likelihood in the current processing cycle.

Next, at S170, the determining unit 32 determines whether a likelihood that is equal to or greater than a likelihood threshold set in advance is present among the likelihoods of the velocity estimation values Ves. When determined that a likelihood that is equal to or greater than the likelihood threshold is not present at S170, the determining unit 32 returns to the process at S40. When determined that a likelihood that is equal to or greater than the likelihood threshold is present at S170, the determining unit 32 proceeds to a process at S180.

At S180, the determining unit 32 determines the velocity V of the target object. Specifically, the determining unit 32 determines the velocity estimation value Ves that has the likelihood that is the greatest and equal to or greater than the likelihood threshold, among the likelihoods of the velocity estimation values Ves corresponding to the same initial detection target object, to be the velocity V of the target object. In addition, the determining unit 32 determines the distance estimation value Res corresponding to the velocity estimation value Ves that is determined to be the velocity V of the target object to be the distance R of the target object.

Next, at S190, the determining unit 32 deletes the other velocity estimation values Ves calculated for the same target object as the target object of which the velocity V is determined. That is, regarding the same initial detection target object as that of the velocity estimation value Ves that is determined to be the velocity V, the velocity estimation value Ves calculated based on a presumption of a folding number M that differs from that of said velocity estimation value Ves is deleted.

Next, at S200, the warning determining unit 33 determines whether a warning is to be outputted based on the velocity V and the distance R determined at S180. That is, the warning determining unit 33 determines a likelihood of a collision between the vehicle 50 and the target object based on the velocity V and the distance R determined at S180. Then, the warning determining unit 33 determines that a warning is to be outputted when the likelihood of a collision is higher than a warning threshold set in advance and determines that a warning is not to be outputted when the likelihood of a collision is lower than the warning threshold. Subsequently, the warning determining unit 33 returns to the process at S40.

Here, in the above-described flowchart, the velocity estimation value Ves is calculated at S60 in the current processing cycle. The velocity prediction value Vpr that is the prediction value of the velocity observation value Vob in the next processing cycle is calculated at S70. However, the present disclosure is not limited thereto. In the next processing cycle, the velocity estimation value Ves in which velocity folding is presumed from the velocity observation value Vob in the previous processing cycle may be calculated, or the velocity prediction value Vpr that is the prediction value of the velocity observation value Vob in this next processing cycle may be calculated. That is, during a period from when the velocity observation value Vob is calculated in an L-th processing cycle (L being an integer of 1 or greater) until the evaluation value is calculated in an L+1-th processing cycle, the velocity estimation value Ves may be calculated from the velocity observation value Vob in the L-th processing cycle, and the velocity prediction value Vpr that is the prediction value of the velocity observation value Vob in the L+1-th processing cycle may be calculated.

<3. Operations>

Figure 9:
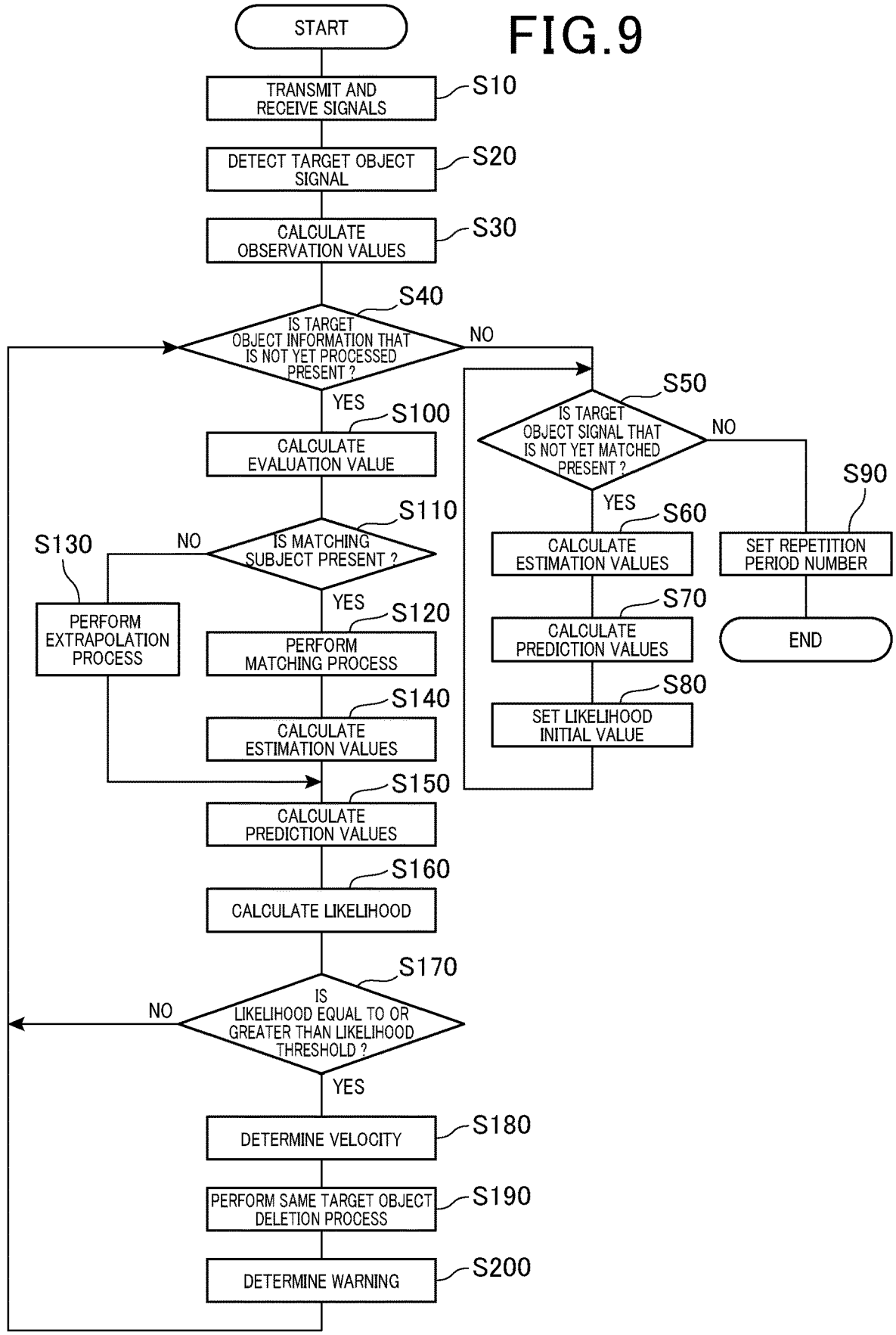
FIG. 9 is a flowchart of the processing steps in a velocity determination process for a target object.

Next, operations when the flowchart shown in FIG. 9 is performed will be described with reference to FIG. 15 to FIG. 19. In FIG. 15 to FIG. 19, a vertical axis indicates velocity and a horizontal axis indicates distance. Respective maximum detected velocities in first to third processing cycles are Vmax1, Vmax2, and Vmax3. The maximum detected velocities Vmax1, Vmax2, and Vmax3 differ from one another. That is, FIG. 15 to FIG. 19 show operations when chirp signals of three differing repetition periods Tcy are transmitted and received as shown in FIG. 8.

Figure 15:
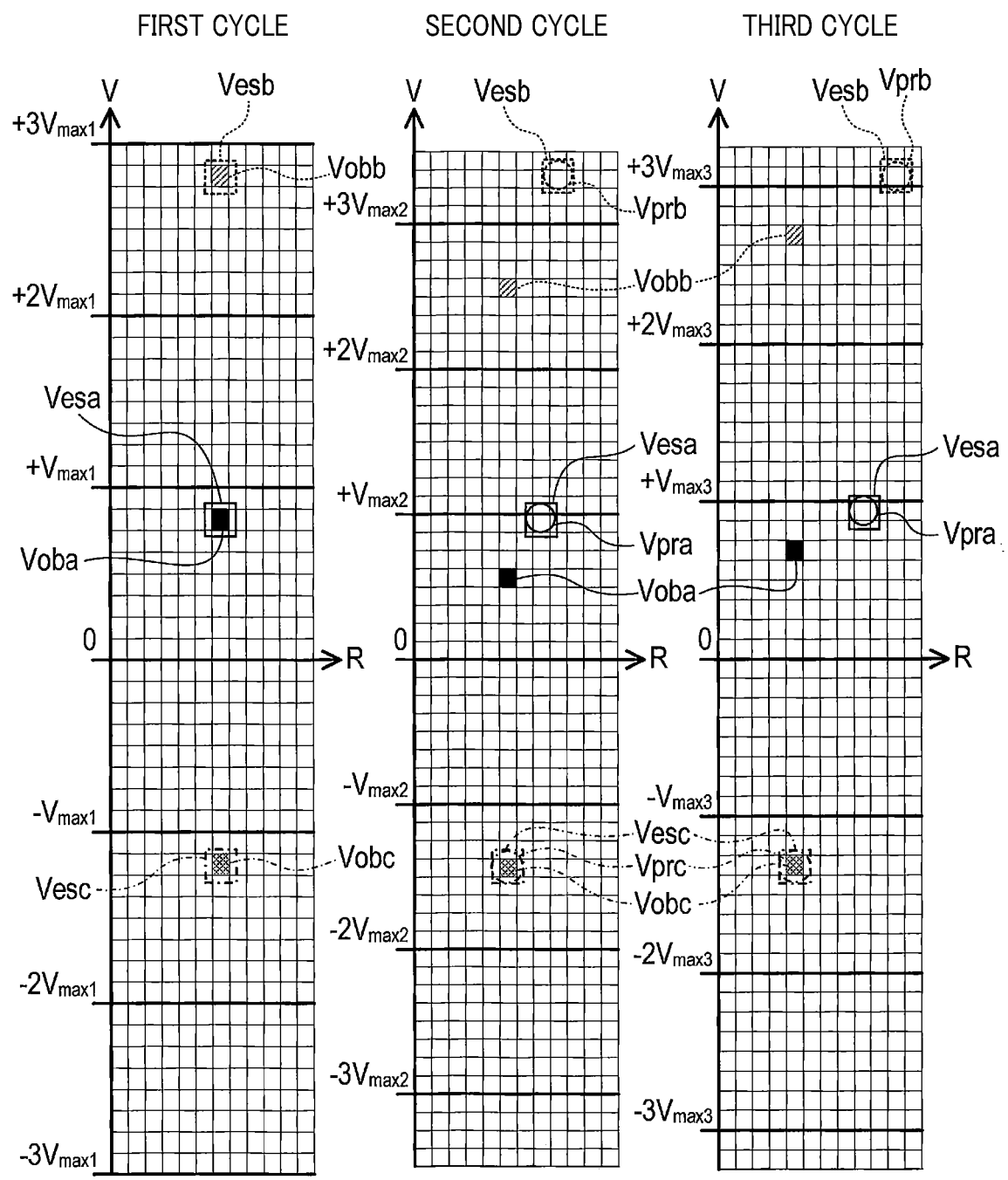
FIG. 15 is a diagram of velocity observation values, velocity estimation values, and velocity prediction values of a target object in first to third processing cycles, when folding occurs −1 times.

First, FIG. 15 shows an example of when velocity folding of −1 time occurs. In the first processing cycle, a target object is initially detected. A velocity observation value Voba and a distance observation value Rob of the initial detection target object are calculated. Furthermore, velocity estimation values Vesa, Vesb, and Vesc are calculated, values thereof being the velocity observation value Voba in the case of no folding, a +1-time folding value Vobb of the velocity observation value Voba, and a −1-time folding value Vobc of the velocity observation value Voba. In addition, initial values of the likelihoods of the velocity estimation values Vesa, Vesb, and Vesc are each calculated.

Furthermore, velocity prediction values Vpra, Vprb, and Vprc and distance prediction values Rpra, Rprb, and Rprc in the second processing cycle are calculated using each of the velocity estimation values Vesa, Vesb, and Vesc. At this time, the velocity prediction values Vpra and Vprb are velocities in a direction moving away from the vehicle 50. Therefore, the distance prediction values Rpra and Rprb are values that are greater than the distance observation value Rob. Meanwhile, the velocity prediction value Vprc is a velocity in a direction approaching the vehicle 50. Therefore, the distance prediction value Rprc is a value that is less than the distance observation value Rob.

Next, in the second processing cycle, the velocity observation value Voba and the distance observation value Roba of the target object are calculated. Then, regarding each of the velocity prediction values Vpra, Vprb, and Vprc, the evaluation value is calculated. The evaluation value corresponding to the velocity prediction value Vprc exceeds the evaluation threshold. As a result, the velocity prediction value Vprc is associated with the velocity observation value Voba. The velocity estimation value Vesc is calculated from the velocity prediction value Vprc and the −1-time folding value Vobc of the velocity observation value Voba. Meanwhile, the extrapolation process is performed on the velocity prediction values Vpra and Vprb, and the velocity estimation values Vesa and Vesb are calculated. In addition, the likelihood of the velocity estimation value Vesc is increased from the initial value of the likelihood. The likelihoods of the velocity estimation values Vesa and Vesb are decreased from the initial values of the likelihoods.

Next, in the third processing cycle, an operation similar to that in the second processing cycle is repeated. The velocity estimation values Vesa, Vesb, and Vesc are calculated. In addition, the likelihood of the velocity estimation value Vesc is increased from that in the second processing cycle. The likelihoods of the velocity estimation values Vesa and Vesb are decreased from those in the second processing cycle.

Figure 16:
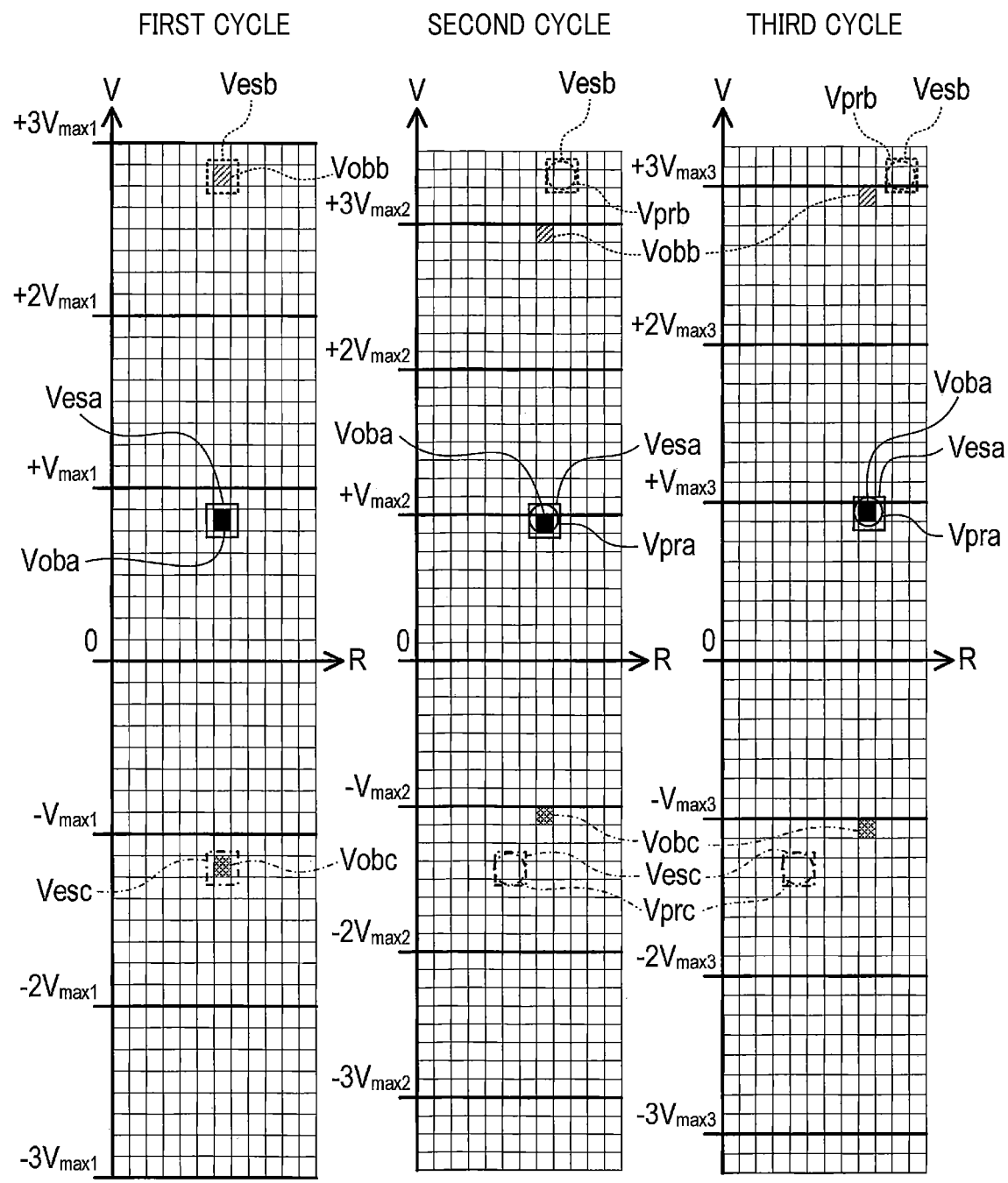
FIG. 16 is a diagram of the velocity observation values, the velocity estimation values, and the velocity prediction values of a target object in the first to third processing cycles, when folding does not occur.

Next, FIG. 16 shows an example of when velocity folding does not occur. In this case, in the first processing cycle, an operation similar to that in the example shown in FIG. 15 is performed. Then, in the second processing cycle, instead of the velocity Vprc in the example shown in FIG. 15, the velocity prediction value Vpra is associated with the velocity observation value Voba. The velocity estimation value Vesa is calculated from the velocity prediction value Vpra and the velocity observation value Voba. In addition, the extrapolation process is performed on the velocity prediction values Vprb and Vprc, and the velocity estimation values Vesb and Vesc are calculated. Then, the likelihood of the velocity estimation value Vesa is increased from the initial value of the likelihood. The likelihoods of the velocity estimation values Vesb and Vesc are decreased from the initial values of the likelihoods. Furthermore, in the third processing cycle, an operation similar to that in the second processing cycle is repeated.

Figure 17:
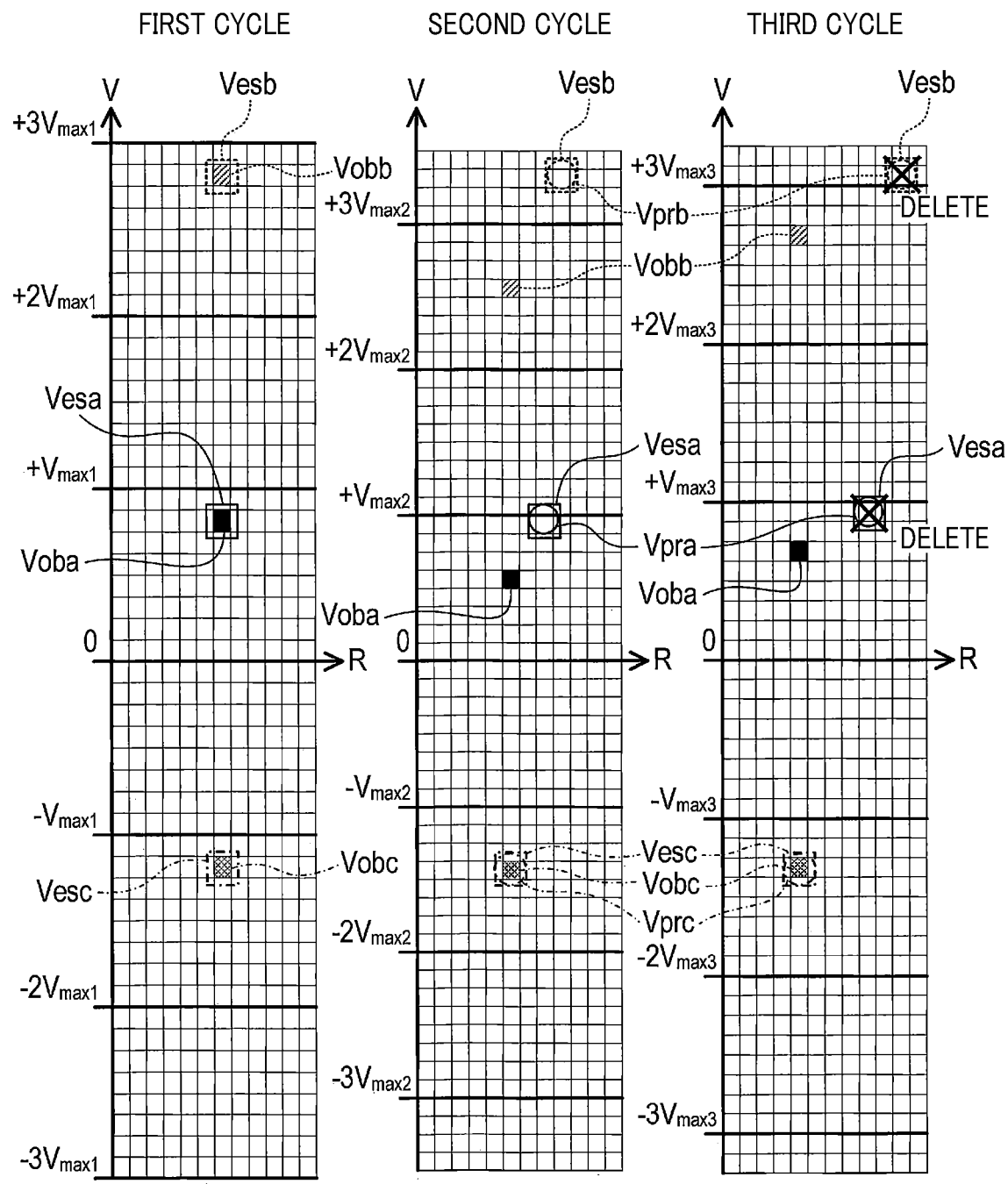
FIG. 17 is a diagram of the velocity observation values, the velocity estimation values, and the velocity prediction values of a target object in the first to third processing cycles, when the velocity of the target object is determined in the third processing cycle.

Next, in a manner similar to FIG. 15, FIG. 17 is an example of when velocity folding of −1 time occurs. In the example shown in FIG. 17, in the third processing cycle, the likelihood of the velocity estimation value Vesc exceeds the likelihood threshold. As a result, the velocity estimation value Vesc is determined to be the velocity V of the target object. As a result of the velocity estimation value Vesc being determined to be the velocity V, the other velocity estimation values Vesa and Vesb calculated regarding the same target object as the velocity estimation value Vesc are determined to be erroneous values. The velocity estimation values Vesa and Vesb are deleted.

Figure 18:
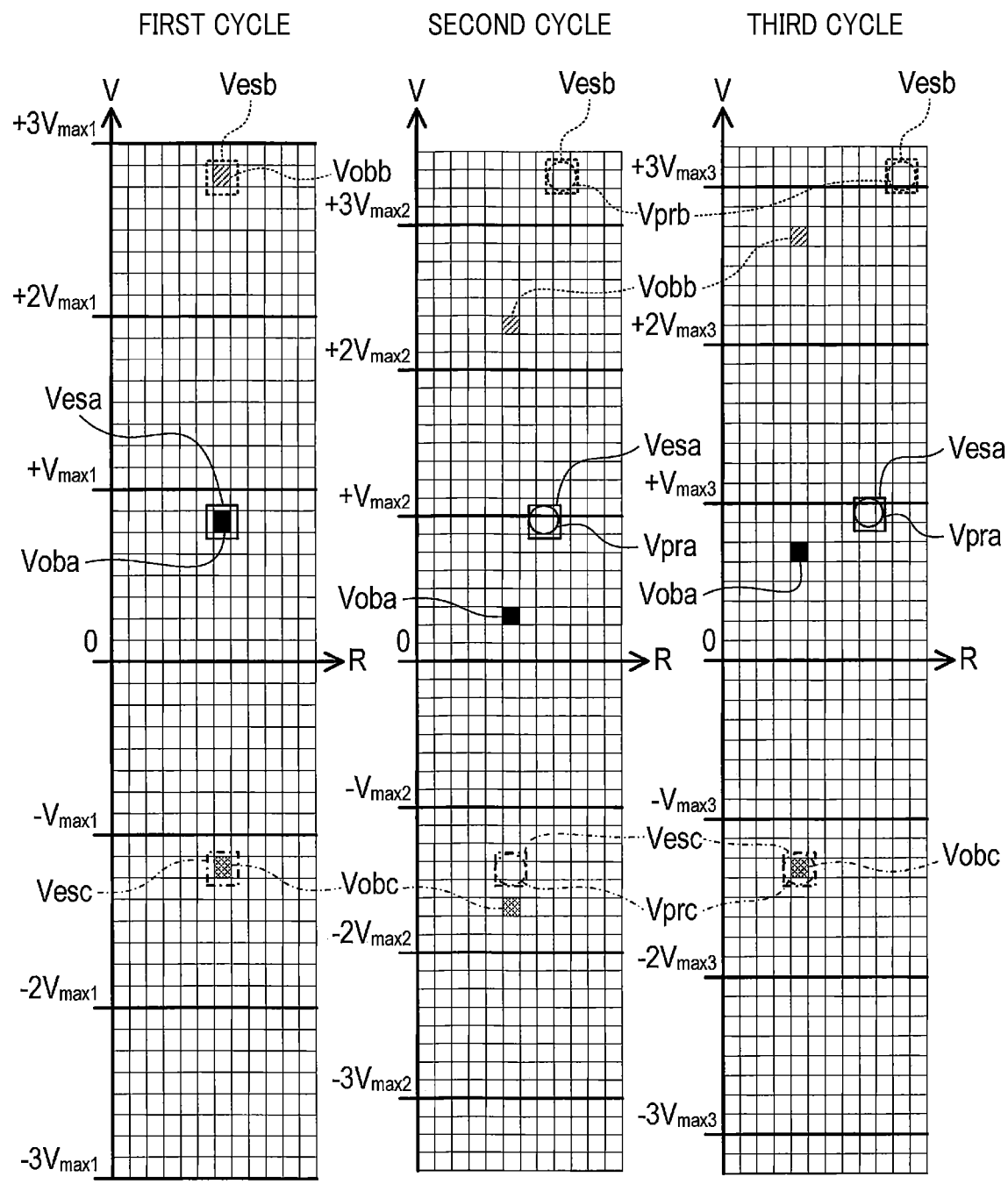
FIG. 18 is a diagram of the velocity observation values, the velocity estimation values, and the velocity prediction values of a target object in the first to third processing cycles, when an extrapolation process is performed.

Next, in a manner similar to FIG. 15, FIG. 18 is an example of when velocity folding of −1 time occurs. In the example shown in FIG. 18, in the second processing cycle, an error is included in the velocity observation value Voba. Matching is not established in the second processing cycle. Therefore, in the second processing cycle, the extrapolation process is performed on the velocity prediction values Vpra, Vprb, and Vprc, and the velocity estimation values Vesa, Vesb, and Vesc are calculated.

Figure 19:
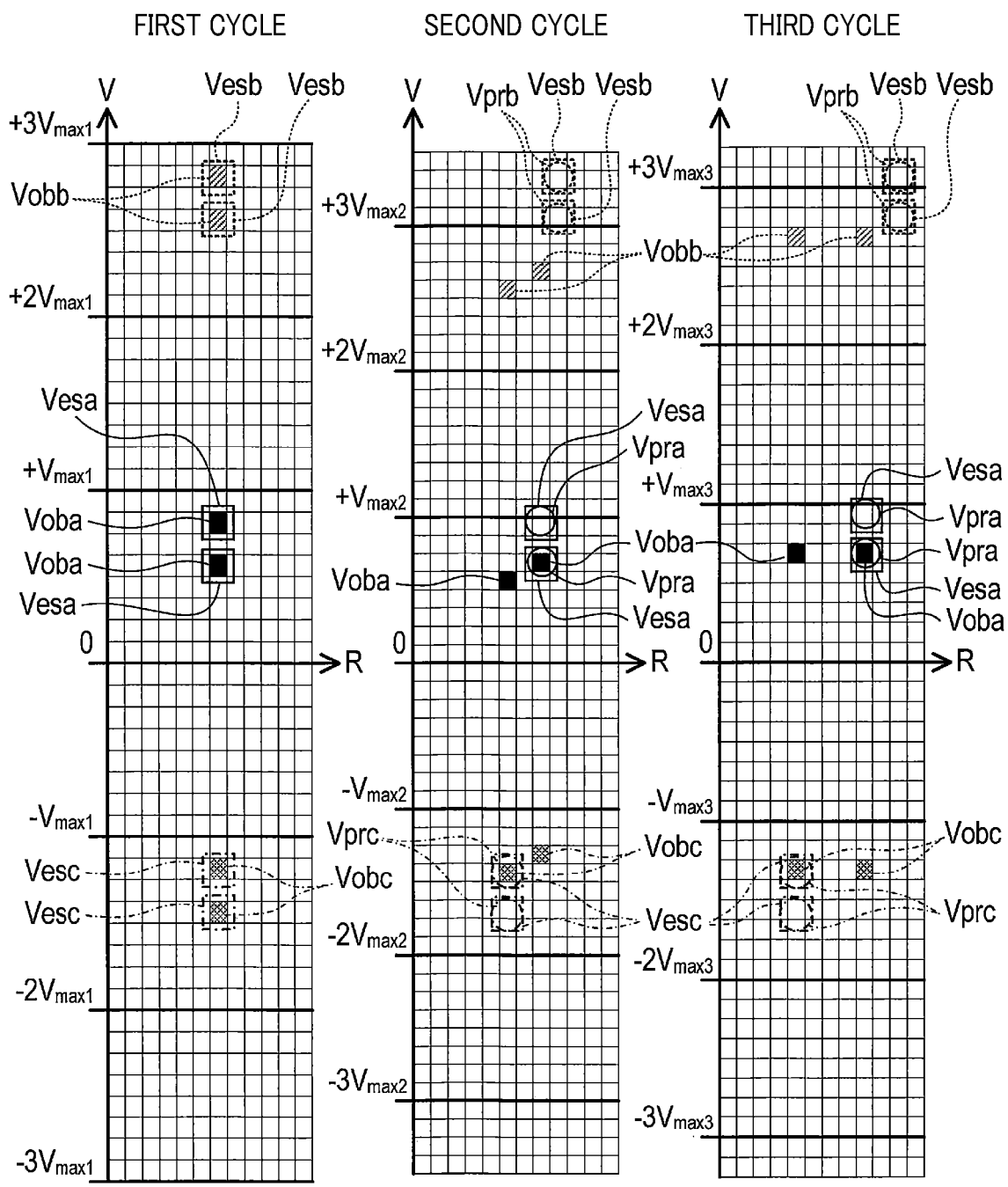
FIG. 19 is a diagram of the velocity observation values, the velocity estimation values, and the velocity prediction values of a target object in the first to third processing cycles, when a plurality of target objects are observed.

Next, FIG. 19 is an example of when two target objects are detected. In the example shown in FIG. 19, regarding the velocity of one target object of the two target objects, velocity folding of −1 time occurs. Regarding the velocity of the other target object, velocity folding does not occur. In the first processing cycle, two target objects are detected. Two velocity observation values Voba and two distance observation values Rob are calculated. In this example, the distance observation values Rob of the two target objects are equal values. In addition, two each of the velocity estimation values Vesa, Vesb, and Vesc, and the velocity prediction values Vpra, Vprb, and Vprc are calculated.

In the second processing cycle, an operation similar to that in the example shown in FIG. 15 is performed. One of the two velocity prediction values Vprc is associated with one of the velocity observation values Vobc, and the velocity estimation value Vesc is calculated. In addition, an operation similar to that in the example shown in FIG. 16 is performed. One of the two velocity prediction values Vpra is associated with the remaining one of the velocity observation value Voba, and the velocity estimation value Vesa is calculated. In addition, operations similar to those in the examples shown in FIG. 15 and FIG. 16 are performed. Two velocity estimation values Vesb, one velocity estimation value Vesa, and one velocity estimation value Vesc are calculated.

In the third processing cycle, an operation similar to that in the second processing cycle is repeated. As a result, the observation velocities Vob of the two target objects that are detected in the first processing cycle and are close in distance and velocity are appropriately associated between cycles. In addition, a determination is made that one of the two target objects is a target object that is approaching the vehicle 50 and the other is a target object that is moving away from the vehicle 50.

<4. Effects>

According to the present embodiment described above, the following effects are achieved.

(1) The maximum detected velocities Vmax between consecutive processing cycles differ. When velocity folding occurs, a difference occurs in the velocity observation values Vob of a same target object between the processing cycles. In addition, a plurality of velocity estimation values Ves in which a plurality of folding numbers are presumed is calculated from the velocity observation value Vob in the current processing cycle. A plurality of velocity prediction values Vpr in the next processing cycle is calculated from the plurality of velocity estimation values Ves.

Then, in the next processing cycle, association of any of the plurality of velocity prediction values Vpr and the velocity observation value Vob is performed. As a result of the plurality of velocity prediction values Vpr presuming a plurality of folding numbers being calculated and used, even in cases in which a plurality of target objects that are close in distance and signal strength is observed in the same processing cycle, the velocity observation values Vob between processing cycles can be appropriately associated.

In addition, based on the result of the association between the velocity prediction value Vpr and the velocity observation value Vob, the velocity V of the target object is determined from the velocity prediction value Vpr and the velocity observation value Vob. Therefore, even in an environment in which a plurality of target objects are present, association of the velocity observation values Vob between processing cycles that have differing repetition periods can be appropriately performed. The velocity V of the target object can be accurately calculated.

(2) Even after a processing cycle in which a target object is initially detected, the target object is continuously tracked. Therefore, calculation accuracy regarding the velocity V of the target object can be improved.

(3) The velocity estimation value Ves corresponding to the velocity prediction value Vpr of which matching is established has a high likelihood of being the velocity V of the target object. Therefore, as a result of the likelihood of such a velocity estimation value Ves being raised, the velocity V of the target object can be determined at an early stage.

(4) When the velocity V is determined, the other velocity estimation values Ves of the same target object as the velocity estimation value Ves that is determined to be the velocity V are deleted. As a result, only the correct velocity estimation value Ves can be left.

(5) As a result of an initial value of likelihood that differs with each folding number being calculated, the initial value of likelihood regarding a folding number that is based on a velocity within a range that has a high probability of being the velocity V of the target object can be increased. The initial value of likelihood regarding a folding number that is based on a velocity within a range that has a low probability of being the velocity V of the target object can be decreased. Furthermore, an erroneous velocity estimation value Ves being determined to be the velocity V can be suppressed.

(6) As a result of an initial value of likelihood that differs for each folding number being calculated based on at least one of the velocity of the vehicle 50, the type of the target object, and the position of the target object, an erroneous velocity estimation value Ves being determined to be the velocity V can be suppressed. A more accurate velocity V of the target object can be determined.

(7) The type of the target object can be estimated from the relationship between the distance to the target object and the strength of the target object signal.

(8) As the velocity prediction value Vpr and the velocity observation value Vob or the folding value thereof become closer, the likelihood of the target object corresponding to the velocity prediction value Vpr and the target object corresponding to the velocity observation value Vob being the same target object increases.

Therefore, as a result of the evaluation value being calculated based on the difference between the velocity prediction value Vpr and the velocity observation value Vob or the folding value thereof, correspondence between the velocity prediction value Vpr and the velocity observation value Vob can be appropriately evaluated using the evaluation value.

(9) When the evaluation value exceeds the evaluation threshold, the likelihood of the target object corresponding to the velocity prediction value Vpr and the target object corresponding to the velocity observation value Vob being the same target object is high. Therefore, the velocity prediction value and the velocity observation value can be associated in cases such as that described above through use of the evaluation value.

(10) Even in cases in which association with the velocity observation value Vob is not established for any of the velocity prediction values Vpr, as a result of the extrapolation process being performed, the target object can be suppressed from becoming instantaneously lost.

(11) The velocity estimation value Ves calculated by the extrapolation process has a lower probability compared to the velocity estimation value Ves calculated when matching is established. Therefore, as a result of the likelihood of the velocity estimation value Ves calculated by the extrapolation process being decreased, an erroneous velocity estimation value Ves being determined to be the velocity V can be suppressed.

(12) When matching is established, the likelihood of the velocity estimation value calculated using the velocity prediction value of which matching is established is changed based on the evaluation value used in the matching process. As a result, the likelihood is increased for a velocity estimation value Ves that is calculated from a velocity prediction value Vpr that is closer to the velocity observation value Vob or the folding value thereof.

(13) Only a target object of which the velocity V is determined is considered to be a warning subject. As a result, an erroneous warning being outputted can be suppressed.

Second Embodiment

1. Differences with the First Embodiment

A basic configuration according to a second embodiment is similar to that according to the first embodiment. Therefore, descriptions of common configurations are omitted. Differences will mainly be described. Here, reference numbers that are the same as those according to the first embodiment indicate identical configurations. Descriptions given above are referenced.

According to the second embodiment, the processes performed by the matching processing unit 27 and the determining unit 32 differ from those according to the first embodiment. The determining unit 32 according to the second embodiment counts a number of occurrences of association by the matching processing unit 27 and determines the velocity V of the target object using the counted association occurrence number.

In addition, the radar apparatus 20 according to the second embodiment provides a function of a connection accuracy calculating unit 35 instead of the likelihood calculating unit 31. The connection accuracy calculating unit 35 calculates accuracy of connection between the velocity prediction value Vpr and the velocity observation value Vob associated by the matching processing unit 27.

Here, the predicting unit 30 also calculates prediction values of the orientation of the target object and the strength of the target object signal, in addition to the prediction values of the speed and the distance of the target object. The connection accuracy calculating unit 35 calculates the connection accuracy in the current processing cycle based on at least one of the differences between the prediction values of the distance, speed, orientation, and strength calculated by the predicting unit 30 and the observation values, and the connection accuracy calculated in the previous processing cycle, as shown in a following expression (5).

$$\text{Connection accuracy} = \alpha(A|Rpr-Rob|+B|Vpr-Vob|+C|\Theta pr-\Theta ob|+D|Ppr-Pob|)+((1-\alpha)\times\text{connection accuracy of previous processing cycle}) \quad (5)$$

In expression (5), $\Theta pr$ denotes the prediction value of the orientation, and $\Theta ob$ denotes the observation value of the orientation. Ppr denotes the prediction value of the strength, and Pob denotes the observation value of the strength. In addition, A, B, C, and D are coefficients and are negative numeric values. A is a numeric value from 0 to 1. Expression (5) is an expression for performing weighted average of the difference between the prediction value and the observation value regarding the distance, speed, orientation, and strength, and the connection accuracy in the previous processing cycle, and calculating the current processing cycle.

Here, the difference between the prediction value and the observation value is merely required to include the difference between the prediction value and the observation value of at least one element among four elements that are distance, speed, orientation, and strength.

2. Processes

Next, differences with the first embodiment in the processing steps in the velocity determination process performed by the radar apparatus 20 according to the second embodiment will be described with reference to the flowcharts in FIG. 9 and FIG. 20. Here, the description of the determination of distance will be omitted.

In a manner similar to that according to the first embodiment, the radar apparatus 20 performs the processes at S10 to S70 and S90 to S100. Next, at S110 and S120, a combination of which the evaluation value is higher than the evaluation threshold is associated. Furthermore, the association occurrence number is counted for each folding number M. For example, when the association occurrence number in the previous processing cycle is 1 and the association is performed in the current processing cycle as well, the association occurrence number is counted up to 2.

Next, in a manner similar to that according to the first embodiment, the radar apparatus 20 performs the processes at S130 to S150.

Figure 20:
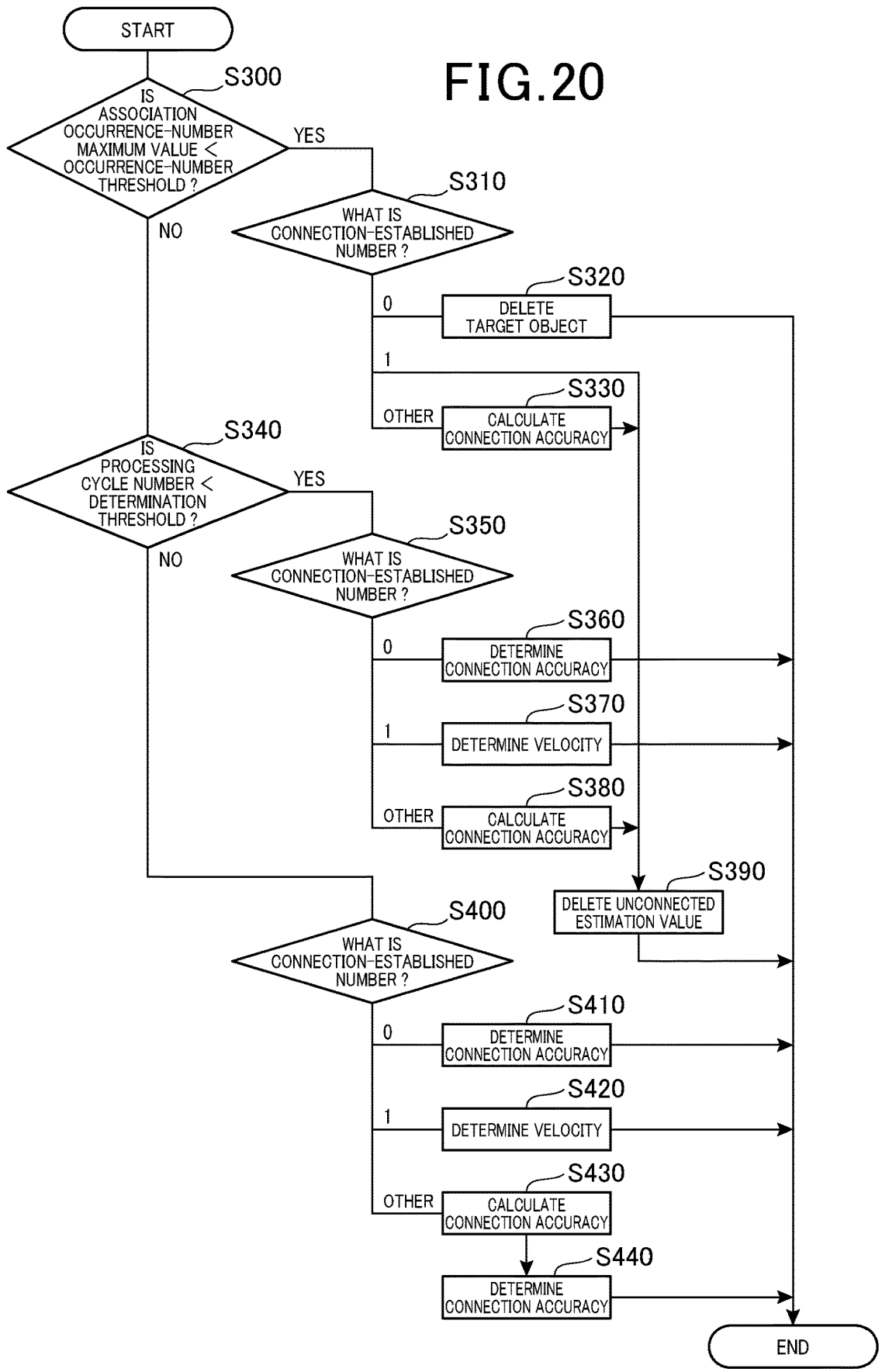
FIG. 20 is a flowchart of the processing steps in the velocity determination process for a target object according to a second embodiment.

Next, the radar apparatus 20 performs the flowchart shown in FIG. 20 instead of the processes at S160 to S180.

At S300, the radar apparatus 20 determines whether a maximum value (referred to, hereafter, as an occurrence-number maximum value) among the association occurrence numbers counted for the folding numbers M is less than an occurrence-number threshold set in advance. When determined that the occurrence-number maximum value is less than the occurrence-number threshold, the radar apparatus 20 proceeds to a process at S310 and determines a connection-established number.

At S310, when determined that the connection-established number is 0, the radar apparatus 20 proceeds to S320 and deletes the target object.

In addition, when determined that the connection-established number is 1 at S310, the radar apparatus 20 proceeds to S390 and deletes the velocity estimation value Ves that is unconnected in the present processing cycle. The velocity estimation value Ves that is unconnected is the velocity estimation value Ves that corresponds to the velocity prediction value Vpr that is not associated with the velocity observation value Vob or the folding value thereof. Regarding the velocity prediction value Vpr of which the association occurrence number is the maximum value, connection is established in the present processing cycle. Therefore, at S390, the radar apparatus 20 deletes the velocity estimation value Ves that corresponds to the velocity prediction value Vpr of which the association occurrence number is not the maximum value.

In addition, at S310, when determined that the connection-established number is other than 0 or 1 (that is, 2 or greater), the radar apparatus 20 calculates the connection accuracy using the above-described expression (5) for each established connection. Subsequently, the radar apparatus 20 proceeds to S390 and deletes the velocity estimation value Ves that is unconnected in the present processing cycle.

Meanwhile, at S300, when determined that the occurrence-number maximum value is equal to or greater than the occurrence-number threshold, the radar apparatus 20 proceeds to a process at S340. At S340, the radar apparatus 20 determines whether a processing cycle number from when the target object is initially detected to the present is less than a determination threshold set in advance. The determination threshold is an upper limit value of the number of processing cycles performed until the velocity V is determined. When determined that the processing cycle number up to the present processing cycle is less than the determination threshold, the radar apparatus 20 proceeds to a process at S350 and determines the connection-established number.

At S350, when determined that the connection-established number is 0, the radar apparatus 20 proceeds to S360. In this case, in the previous processing cycle, the occurrence-number maximum value is equal to or greater than the occurrence-number threshold. However, in the previous processing cycle, because a plurality of velocity prediction values Vpr of which the association occurrence number is the maximum value is present, the velocity V is not determined.

In addition, the connection accuracy is calculated for each connection that is established. Therefore, at S360, the radar apparatus 20 determines the velocity estimation value Ves that corresponds to the velocity prediction value Vpr of which the connection accuracy calculated in the previous processing cycle is the greatest, among the velocity prediction values Vpr of which the association occurrence number is the maximum value, to be the velocity V. That is, when the velocity prediction value Vpr of which the occurrence-number maximum value is equal to or greater than the occurrence-number threshold and association is established in the present processing cycle is not present, the velocity V is determined through use of the connection accuracy.

In addition, at S350, when determined that the connection-established number is 1, the radar apparatus 20 proceeds to a process at S370. The radar apparatus 20 determines the velocity estimation value Ves that corresponds to the velocity prediction value Vpr that is the occurrence-number maximum value to be the velocity V.

In addition, at S350, when determined that the connection-established number is other than 0 or 1, the radar apparatus 20 proceeds to S380 and calculates the connection accuracy for each connection that is established. That is, when a plurality of velocity prediction values Vpr that are the occurrence-number maximum value is present and a plurality of velocity prediction values Vpr of which association is established is present in the present processing cycle, the radar apparatus 20 calculates the connection accuracy for each connection without determining the velocity V. Subsequently, the radar apparatus 20 proceeds to S390 and deletes the velocity estimation value Ves that is unconnected.

Meanwhile, at S340, when determined that the processing cycle number up to the present is equal to or greater than the determination threshold, the radar apparatus 20 proceeds to S400 and determines the connection-established number.

At S400, when determined that the connection-established number is 0, the radar apparatus 20 proceeds to S410. At S410, the radar apparatus 20 determines the velocity estimation value Ves that corresponds to the velocity prediction value Vpr of which the connection accuracy calculated in the previous processing cycle is the greatest, among the velocity prediction values Vpr of which the association occurrence number is the maximum value, to be the velocity V.

In addition, at S400, when determined that the connection-established number is 1, the radar apparatus 20 proceeds to S420 and determines the velocity estimation value Ves that corresponds to the velocity prediction value Vpr that is the occurrence-number maximum value to be the velocity V.

Furthermore, at S400, when determined that the connection-established number is other than 0 or 1, the radar apparatus 20 proceeds to 430 and calculates the connection accuracy for each connection that is established. Subsequently, at S440, the radar apparatus 20 determines the velocity estimation value Ves that corresponds to the velocity prediction value Vpr of which the connection accuracy calculated at S430 is the greatest, among the velocity prediction values Vpr of which the association occurrence number is the maximum value, to be the velocity V.

That is, when the processing cycle number up to the present reaches the determination threshold, the velocity V is determined. At this time, when a plurality of velocity prediction values Vpr of which the association occurrence number is the maximum value is present, the velocity estimation value Ves that corresponds to the velocity prediction value Vpr of which the calculated connection accuracy is the greatest is determined to be the velocity V.

Next, the radar apparatus 20 performs the processes at S190 and S200.

According to the second embodiment described above, the following effects are achieved.

(14) The connection accuracy is calculated based on at least one of the difference between the prediction value and the observation value of at least one of distance, speed, orientation, and strength, and the connection accuracy calculated in the previous processing cycle. As a result, the velocity V can be determined through use of the connection accuracy.

(15) As a result of the association occurrence number being counted for each folding number M, the velocity V can be determined through use of the association occurrence number.

(16) When one velocity prediction value Vpr of which the occurrence-number maximum value is equal to or greater than the occurrence-number threshold and the association occurrence number is the greatest is present, the velocity V can be determined without use of the connection accuracy.

(17) When a plurality of velocity prediction values Vpr of which the processing cycle number from when the target object is initially detected to the present processing cycle is less than the determination threshold and the association occurrence number is the greatest is present, the velocity V is not determined. Therefore, tracking of the target object can be continued in the next and subsequent processing cycles.

(18) When the occurrence-number maximum value is equal to or greater than the occurrence-number threshold and connection is not established in the present processing cycle, the velocity V can be determined through use of the connection accuracy calculated in the previous processing cycle.

(19) When the processing cycle number up to the present reaches the determination threshold, the velocity V can be determined.

(20) When a plurality of velocity prediction values Vpr of which the association occurrence number is the greatest is present, the velocity V can be determined through use of the connection accuracy calculated in the current processing cycle.

Other Embodiments

Embodiments for carrying out the present disclosure are described above. However, the present disclosure is not limited to the above-described embodiments. Various modifications are possible.

(a) According to the above-described embodiments, the evaluating unit 26 calculates the evaluation value using both the velocity prediction value Vpr and the distance prediction value Rpr of the target object. However, the evaluating unit 26 may calculate the evaluation value using only the velocity prediction value Vpr. That is, the evaluating unit 26 may calculate the evaluation value based on only the difference between the velocity prediction value Vpr and the velocity observation value Vob or the folding value thereof.

(b) According to the above-described first embodiment, the predicting unit 30 calculates the prediction values of the velocity and the distance of the target object. However, the predicting unit 30 may also calculate the prediction values of the orientation of the target object and the strength of the target object signal. The predicting unit 30 may calculate the prediction value of at least one of the distance of the target object, the orientation of the target object, and the strength of the target object signal, in addition to the prediction value of the velocity of the target object. As a result, the velocity V of the target object can be more accurately calculated.

In this case, the evaluating unit 26 may calculate the evaluation value based on, in addition to the difference between the velocity prediction value Vpr and the velocity observation value Vob or the folding value thereof, the difference between the other prediction value that is calculated and the observation value. That is, the evaluating unit 26 may calculate the evaluation value so as to increase as a total value of all calculated differences decreases. As a result, the velocity V of the target object can be more accurately calculated.

(c) According to the above-described embodiments, the radar apparatus 20 is an FCM-type millimeter-wave radar. However, the present disclosure is not limited thereto. For example, the radar apparatus 20 may be a pulse-type millimeter-wave radar that transmits pulse signals at a repetition period that is set.

(d) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to an above-described embodiment may be added to or replace a configuration according to another of the above-described embodiments.

What is claimed is:

1. A radar apparatus that is mountable to a vehicle, the radar apparatus comprising:
a transmitting unit that is configured to transmit a transmission signal that is a pulse signal or a chirp signal at a repetition period that is set;
a receiving unit that is configured to receive a reflection signal that is generated as a result of the transmission signal transmitted by the transmitting unit being reflected by a target object;
a setting unit that is configured to set, as the repetition period of a next processing cycle, a repetition period that differs from the repetition period of a current processing cycle;
a detecting unit that is configured to detect a target object signal that indicates the target object from the reflection signals received by the receiving unit;
an observing unit that is configured to calculate a velocity observation value from the target object signal detected by the detecting unit, in which the velocity observation value is an observation value of a relative velocity in relation to the target object and includes ambiguity in velocity due to folding;
an estimating unit that is configured to calculate, regarding an initial detection target object, a plurality of velocity estimation values in which velocity folding from k times to k+n times is presumed, k being an integer, and n being an integer that is 1 or greater, using the velocity observation value calculated by the observing unit, in which the initial detection target object is the target object that is initially detected by the detecting unit in the current processing cycle;
a predicting unit that is configured to calculate a velocity prediction value from each of the plurality of velocity estimation values calculated by the estimating unit, in which the velocity prediction value is a prediction value of the velocity observation value in the next processing cycle;
a matching processing unit that is configured to perform, in the next processing cycle, association of the velocity prediction value calculated by the predicting unit and the velocity observation value calculated by the observing unit in the next processing cycle; and
a determining unit that is configured to determine the relative velocity from the velocity prediction value and the velocity observation value based on a result of the association by the matching processing unit.

2. A radar apparatus that is mountable to a vehicle, the radar apparatus comprising:
a transmitting unit that is configured to transmit a transmission signal that is a pulse signal or a chirp signal at a repetition period that is set;
a receiving unit that is configured to receive a reflection signal that is generated as a result of the transmission signal transmitted by the transmitting unit being reflected by a target object;
a setting unit that is configured to set, as the repetition period of a next processing cycle, a repetition period that differs from the repetition period of a previous processing cycle;
a detecting unit that is configured to detect a target object signal that indicates the target object from the reflection signals received by the receiving unit;
an observing unit that is configured to calculate a velocity observation value from the target object signal detected by the detecting unit, in which the velocity observation value is an observation value of a relative velocity in relation to the target object and includes ambiguity in velocity due to folding;
an estimating unit that is configured to calculate, regarding an initial detection target object, a plurality of velocity estimation values in which velocity folding from k times to k+n times is presumed, k being an integer, and n being an integer that is 1 or greater, using the velocity observation value calculated by the observing unit, in which the initial detection target object is the target object that is initially detected by the detecting unit in the previous processing cycle;
a predicting unit that is configured to calculate a velocity prediction value from each of the plurality of velocity estimation values calculated by the estimating unit, in which the velocity prediction value is a prediction value of the velocity observation value in the next processing cycle;
a matching processing unit that is configured to perform, in the next processing cycle, association of the velocity prediction value calculated by the predicting unit and the velocity observation value calculated by the observing unit in the next processing cycle; and
a determining unit that is configured to determine the relative velocity from the velocity prediction value and the velocity observation value based on a result of the association by the matching processing unit, in the next and subsequent processing cycles.

3. The radar apparatus according to claim 1, wherein:
the estimating unit is configured to calculate the plurality of velocity estimation values for velocity folding from k times to k+n times (k being an integer that is 0 or less, n being an integer that is 1 or greater, and k+n being an integer that is 0 or greater).

4. The radar apparatus according to claim 1, wherein:
the estimating unit is configured to calculate the velocity estimation value of the initial detection target object in the next and subsequent processing cycles of the processing cycle in which the initial detection target object is detected by the detecting unit, based on the velocity observation value that calculated by the observing unit in the processing cycle that is being performed, and the velocity prediction value that is the velocity prediction value that is predicted by the predicting unit from the velocity estimation value in the processing cycle before the processing cycle that is being performed and associated with the velocity observation value by the matching processing unit.

5. The radar apparatus according to claim 1, comprising:
a likelihood calculating unit that is configured to calculate, regarding each of the velocity estimation values, a likelihood that indicates a probability of the velocity estimation value.

6. The radar apparatus according to claim 5, wherein:
the likelihood calculating unit is configured to increase the likelihood of the velocity estimation value that corresponds to the velocity prediction value of which association is established, when the association is established by the matching processing unit.

7. The radar apparatus according to claim 5, wherein:
the determining unit is configured to determine a maximum likelihood estimation value to be the relative velocity in the processing cycle when any of the likelihoods exceeds a likelihood threshold that is set in advance, and delete the other velocity estimation values that are calculated by the estimating unit regarding the initial detection target object corresponding to the maximum likelihood estimation value, in which the maximum likelihood estimation value is the velocity estimation value of which the likelihood is greatest among the likelihoods corresponding to a same initial detection target object and exceeds the likelihood threshold.

8. The radar apparatus according to claim 5, wherein:
the likelihood calculating unit is configured to calculate, regarding each velocity estimation value, an initial value of the likelihood that differs for each folding number.

9. The radar apparatus according to claim 8, wherein:
the likelihood calculating unit is configured to calculate the initial value of the likelihood based on at least one of velocity of the vehicle, type of the target object, and position of the target object.

10. The radar apparatus according to claim 9, wherein:
the likelihood calculating unit is configured to estimate the type of the target object from a relationship between distance to the target object and strength of the target object signal.

11. The radar apparatus according to claim 5, comprising:
an evaluating unit that is configured to calculate an evaluation value that evaluates correspondence between each of the plurality of velocity prediction values and the velocity observation value or a folding value thereof, based on a difference between each of the plurality of velocity prediction values and the velocity observation value or a folding value thereof.

12. The radar apparatus according to claim 11, wherein:
the matching processing unit is configured to associate, among combinations of the velocity observation value or a folding value thereof, and each of the plurality of velocity prediction values corresponding to a same initial detection target object, a combination of which the evaluation value calculated by the evaluating unit is greatest and higher than an evaluation threshold that is set in advance.

13. The radar apparatus according to claim 12, comprising:
an extrapolation processing unit that is configured to perform an extrapolation process in which, when the velocity prediction value is not associated with the velocity observation value by the matching processing unit, sets the velocity prediction value that is not associated as the velocity estimation value.

14. The radar apparatus according to claim 13, wherein:
the likelihood calculating unit is configured to decrease the likelihood of the velocity estimation value that is calculated by the extrapolation process, when the extrapolation process is performed by the extrapolation processing unit.

15. The radar apparatus according to claim 11, wherein:
the likelihood calculating unit is configured to change the likelihood of the velocity estimation value that corresponds to the velocity prediction value of which association is established, based on the evaluation value used for the association, when the association is established by the matching processing unit.

16. The radar apparatus according to claim 11, wherein:
the predicting unit is further configured to calculate a prediction value in the next processing cycle regarding at least one of distance to the target object, orientation of the target object in relation to the vehicle, and strength of the target object signal.

17. The radar apparatus according claim 16, wherein:
the evaluating unit is further configured to calculate the evaluation value based on a difference between a prediction value of at least one of the distance, the orientation, and the strength calculated by the predicting unit and an observation value thereof.

18. The radar apparatus according to claim 1, comprising:
a warning determining unit that is configured to determine whether a warning is to be outputted, with the target object of which the relative speed is determined by the determining unit as a warning subject.

19. The radar apparatus according to claim 1, wherein:
the predicting unit is further configured to calculate a prediction value in the next processing cycle regarding at least one of distance to the target object, orientation of the target object in relation to the vehicle, and strength of the target object signal; and the radar apparatus includes an accuracy calculating unit that is configured to calculate connection accuracy of the velocity prediction value and the velocity observation value of a folding value thereof, the accuracy calculating unit being configured to calculate the connection accuracy based on at least one of a difference between the prediction value of at least one of the distance, the velocity, the orientation, and the strength calculated by the predicting unit and an observation value thereof, and the connection accuracy calculated in a previous processing cycle.

20. The radar apparatus according to claim 19, wherein:
the determining unit is configured to count a number of occurrences of the association by the matching processing unit.

21. The radar apparatus according to claim 19, wherein:
the determining unit is configured to determine the relative velocity when any of the numbers of occurrences of the association is equal to or greater than an occurrence-number threshold, and one velocity prediction value of which the number of occurrences of the association is greatest is present.

22. The radar apparatus according to claim 19, wherein:
the estimating unit is configured not to determine the relative velocity when a processing cycle number from when the target object is initially detected by the detecting unit to a present processing cycle is less than a determination threshold that is set, and a plurality of velocity prediction values of which the number of occurrences of the association is greatest is present.

23. The radar apparatus according to claim 19, wherein:
the determining unit is configured to determine the relative velocity when any of the numbers of occurrences of the association is equal to or greater than an occurrence-number threshold, and the velocity prediction value of which association is established by the matching processing unit in the present processing cycle is not present.

24. The radar apparatus according to claim 19, wherein:
the determining unit is configured to determine the relative velocity when a processing cycle number from when the target object is initially detected by the detecting unit to a present processing cycle reaches a determination threshold that is set.

25. The radar apparatus according to claim 19, wherein:
when one velocity prediction value of which the number of occurrences of the association is greatest is present, the determining unit is configured to determine the velocity estimation value that corresponds to the velocity prediction value of which the number of occurrences of the association is the greatest to be the relative velocity.

26. The radar apparatus according to claim 19, wherein:
when a plurality of velocity prediction values of which the number of occurrences of the association is greatest is present, the determining unit is configured to determine the velocity estimation value that corresponds to the velocity prediction value of which the connection accuracy calculated by the accuracy calculating unit is greatest to be the relative velocity.

27. The radar apparatus according to claim 19, wherein:
when the relative velocity is established, the determining unit is configured to delete other velocity estimation values corresponding to the target object of which the relative velocity is established.

28. The radar apparatus according to claim 19, wherein:
the determining unit is configured to delete the velocity estimation value that corresponds to the velocity prediction value of which the number of occurrences of the association is not greatest.

29. The radar apparatus according to claim 1, wherein:
the matching processing unit is further configured to perform, in the next processing cycle, association of: (i) the velocity prediction value calculated by the predicting unit; and (ii) the velocity observation value calculated by the observing unit in the next processing cycle and a folding value thereof.

30. The radar apparatus according to claim 2, wherein:
the matching processing unit is further configured to perform, in the next processing cycle, association of: (i) the velocity prediction value calculated by the predicting unit; and (ii) the velocity observation value calculated by the observing unit in the next processing cycle and a folding value thereof.

\* \* \* \* \*